(12) United States Patent
Sauer

(10) Patent No.: US 12,551,218 B2
(45) Date of Patent: Feb. 17, 2026

(54) VASCULAR CLAMP ASSEMBLY

(71) Applicant: LSI Solutions, Inc., Victor, NY (US)

(72) Inventor: Jude S. Sauer, Pittsford, NY (US)

(73) Assignee: LSI Solutions, Inc., Victor, NY (US)

( * ) Notice: Subject to any disclaimer, the term of this patent is extended or adjusted under 35 U.S.C. 154(b) by 97 days.

(21) Appl. No.: 18/666,446

(22) Filed: May 16, 2024

(65) Prior Publication Data

US 2024/0382210 A1 Nov. 21, 2024

Related U.S. Application Data

(60) Provisional application No. 63/467,264, filed on May 17, 2023.

(51) Int. Cl.
  *A61B 17/122* (2006.01)
  *A61B 17/00* (2006.01)
  *A61B 17/128* (2006.01)

(52) U.S. Cl.
  CPC .. *A61B 17/122* (2013.01); *A61B 2017/00367* (2013.01); *A61B 2017/00477* (2013.01); *A61B 17/1285* (2013.01)

(58) Field of Classification Search
  CPC .............. A61B 17/122; A61B 17/1285; A61B 2017/00367; A61B 2017/00477
  See application file for complete search history.

(56) References Cited

U.S. PATENT DOCUMENTS

| 5,921,996 A | 7/1999 | Sherman |
| 11,229,441 B2 | 1/2022 | Sauer |
| 2019/0374297 A1* | 12/2019 | Wallace ................ A61B 34/30 |
| 2022/0218377 A1* | 7/2022 | Lee ........................ A61B 34/71 |

OTHER PUBLICATIONS

European Search Report for Application No. 24176498.4, dated Oct. 18, 2024, 6 pages.

* cited by examiner

*Primary Examiner* — Brooke Labranche
(74) *Attorney, Agent, or Firm* — Michael E. Coyne

(57) ABSTRACT

A vascular clamp assembly includes a first arm assembly that is pivotably coupled to a second arm assembly. The first arm assembly includes a first pulley disposed in a first recess, and the second arm assembly includes a second pulley disposed in a second recess. A coupling member extends from a portion of the first arm assembly, the coupling member including a cylindrical portion having a first channel and a second channel extending along a portion of the cylindrical portion, and each of the first and second channels is configured to receive a portion of an engagement rod of a delivery device to secure the coupling member within a securement portion of the delivery device in one of at least two possible orientations. A portion of suture contacts each of the first and second pulley to displace the vascular clamp assembly from an opened position to a closed position.

13 Claims, 21 Drawing Sheets

VASCULAR CLAMP ASSEMBLY

CROSS-REFERENCE TO RELATED APPLICATIONS

This application claims the benefit of U.S. Provisional Patent Application No. 63/467,264, filed May 17, 2023, the contents of which is hereby incorporated by reference in its entirety.

FIELD OF THE INVENTION

The claimed invention relates to clamping devices, and more specifically to a vascular clamping device.

BACKGROUND

The ability of cardiac surgeons to successfully treat an ever-increasing number of heart conditions is well-documented. From relatively crude attempts by surgeons to repair stab wounds to the heart at start of the $20^{th}$ century, to exploratory attempts in the first half of the 1900's to open or repair heart valves before reliable cardio-pulmonary bypass (CPB) became available, to the steady stream of advances in cardiology in the second half of the $20^{th}$ century, including CPB improvements and cold blood cardioplegia techniques to enable increased operating time while minimizing damage to the heart, prosthetic heart valve development for mitral and aortic valve replacement, coronary artery bypass grafting, and a host of other cardiac procedures, open heart surgery continues to improve at an impressive rate. As the $21^{st}$ century is well underway, cardiac surgery continues to improve, with a focus on less invasive heart surgery.

A variety of technologies, knowledge, and surgical skills are utilized to enable less invasive cardiac surgery. As one example, consider one method of aortic valve replacement and the logistical situation presented by such a surgery as highlighted in FIGS. 35 and 36. FIG. 35 schematically illustrates a human thorax 350 outlined in a solid line with ribcage 352 approximated with the broken lines. A heart 354 and some of the veins and arteries leading to and from the heart 354 are represented by the dotted lines. The heart 354, and in particular, the aorta 356 are generally well protected by the ribcage 352. Before recent advances in cardiac surgery, it was frequently necessary to "crack" the sternum 358 and spread the left and right halves of the ribcage 352 following a sternotomy (incision which can run twenty centimeters (cm) or more down a patient's chest over the sternum 358). However, while providing excellent access to the heart 354 it is preferable to avoid a sternotomy and the long recovery times and high levels of pain associated with such invasive surgery.

As a less invasive alternative, surgeons are often able to use a thoracotomy (preferably an incision between the ribs) as an access point to operate on the heart. FIG. 36 schematically illustrates a thoracotomy in the context of this aortic valve replacement example. A minimally invasive incision 360 is made in the right second intercostal space (between the second and third ribs 362, 364) while simultaneously gaining percutaneous access to a femoral vein 366. Muscle is dissected from the ribs 362, 364 and retractors (not shown) are placed to spread the incision 360 and the ribs 362, 364 to create a minimally invasive opening 368. With access available through a less invasive opening 368, the pericardium is incised over the aorta 356. Stay sutures (not shown) can be placed in tissues and pulled back to increase access to the aorta 356.

A venous cannula 370 is prepared and inserted after dilation of the percutaneous incision in the femoral vein 366. A guide wire can be placed into the venous cannula 370 and threaded through the femoral vein 366, through the inferior vena cava 372, into the right atrium 374 of the heart 354, and into the superior vena cava 376. A series of dilators (not shown) are used to widen the guide wire tract to the venous cannula 370. The venous cannula 370 is attached to the input side of a CPB machine 378, providing a path for the bypass machine 378 to grab deoxygenated blood that has returned from the body to the heart 354. An aortic cannula 380 is also placed and attached to the output side of the bypass machine 378, providing a place for re-oxygenated blood (supplied by the bypass machine 378) to be returned to the body.

The superior vena cava 376 is dissected away from the aorta 356, and an aortic cross clamp (not shown) is introduced on the heart side of the aortic cannula 380, but away from the aortic valve. The aortic cross clamp seals the aorta 356 so that the CPB machine 378 can begin circulating oxygenated blood to the body without leakage back through the heart 354. The heart 354 is stopped, for example, by medication and/or lowering the temperature of the heart, and a transverse aortotomy is created to expose the aortic valve. The defective aortic valve is then cut out and care is taken to remove any debris, such as calcium or plaque deposits, which may have accumulated on the valve and come loose during the valve removal.

A replacement aortic valve (either mechanical, synthetic, or donor tissue) is then seated and sewed into place. The aortotomy is then closed. The aortic cross clamp is removed, the heart 354 is restarted, and the cannula connection points 370, 380 are removed to disconnect the patient from the CPB machine 378. Finally, the remaining open incisions are closed.

While the minimally invasive nature of the incisions can result in shortened patient recovery times, the demands on a surgeon during such a procedure can be high considering that the surgeon has a very small incision window defined by the opening 68 within which the operation must take place. Space is at a premium, and the surgeon must find a way to manage tubing for the aortic cannula and associated tubing for the CPB machine, the aortic cross-clamp, pull-back sutures, closure sutures for the cannula incision, and any of the necessary scalpels, manipulators, suture needles, and suction devices so that there is still room to install the replacement valve through the opening 368 in the ribs.

If an aortic cross clamp inappropriately releases or slips off the aorta, visualization and hemodynamic control can be lost, and the patient can exsanguinate. Therefore, there is first and foremost a need for surgical clamp devices that have a reliable and strong clamping force. There is also a need for such surgical clamping devices to be compatible with less invasive cardiac surgical procedures such that surgeons can easily operate and manipulate the clamps through small access sites, such as a port or a cannula, or through a small incision while preferably creating little to no reduction in the surgical access area. There is further a need for such surgical clamps to be easily releasable and removable.

DETAILED DESCRIPTION OF THE INVENTION

Figure 27A:
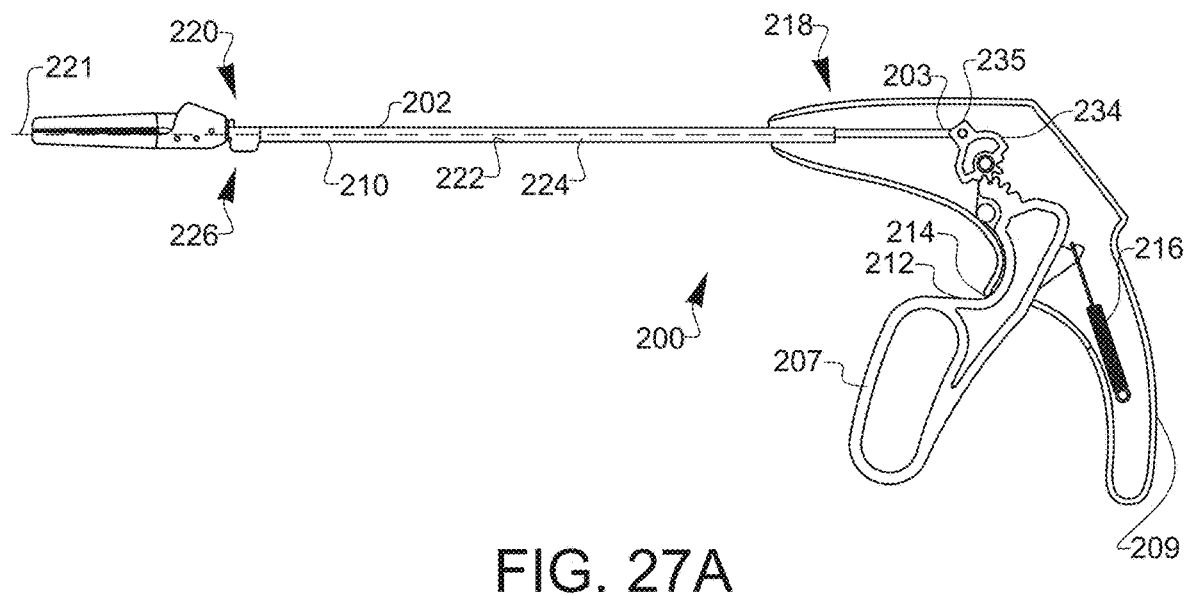
FIGS. 27A, 27B, and 28A are side views of the embodiment of the delivery device assembly of FIG. 22.
Figure 27B:
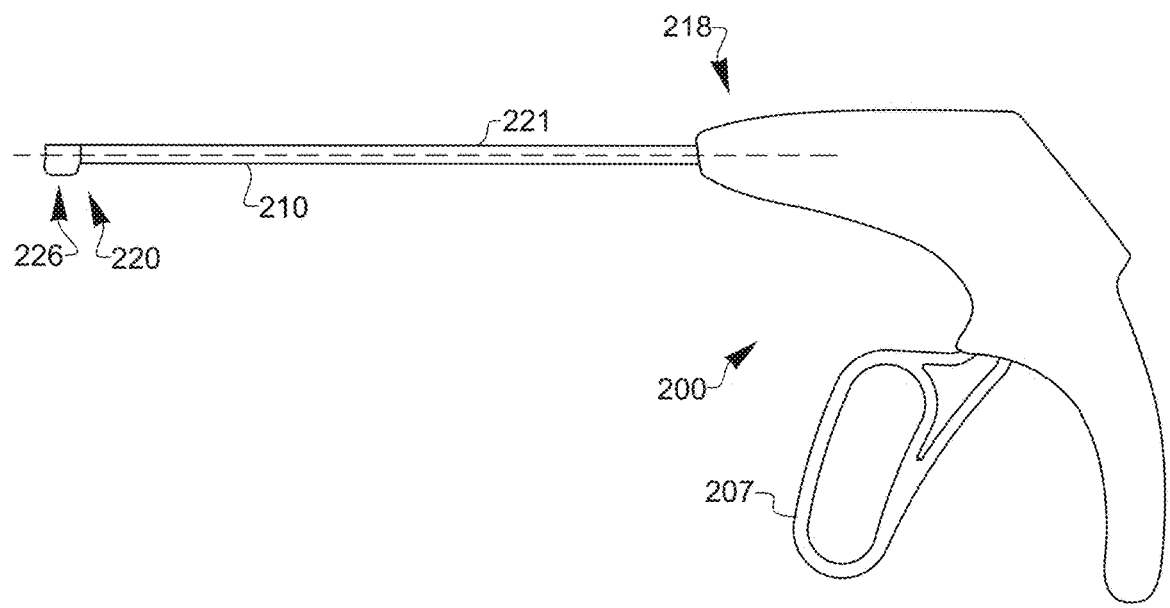
Figure 31A:
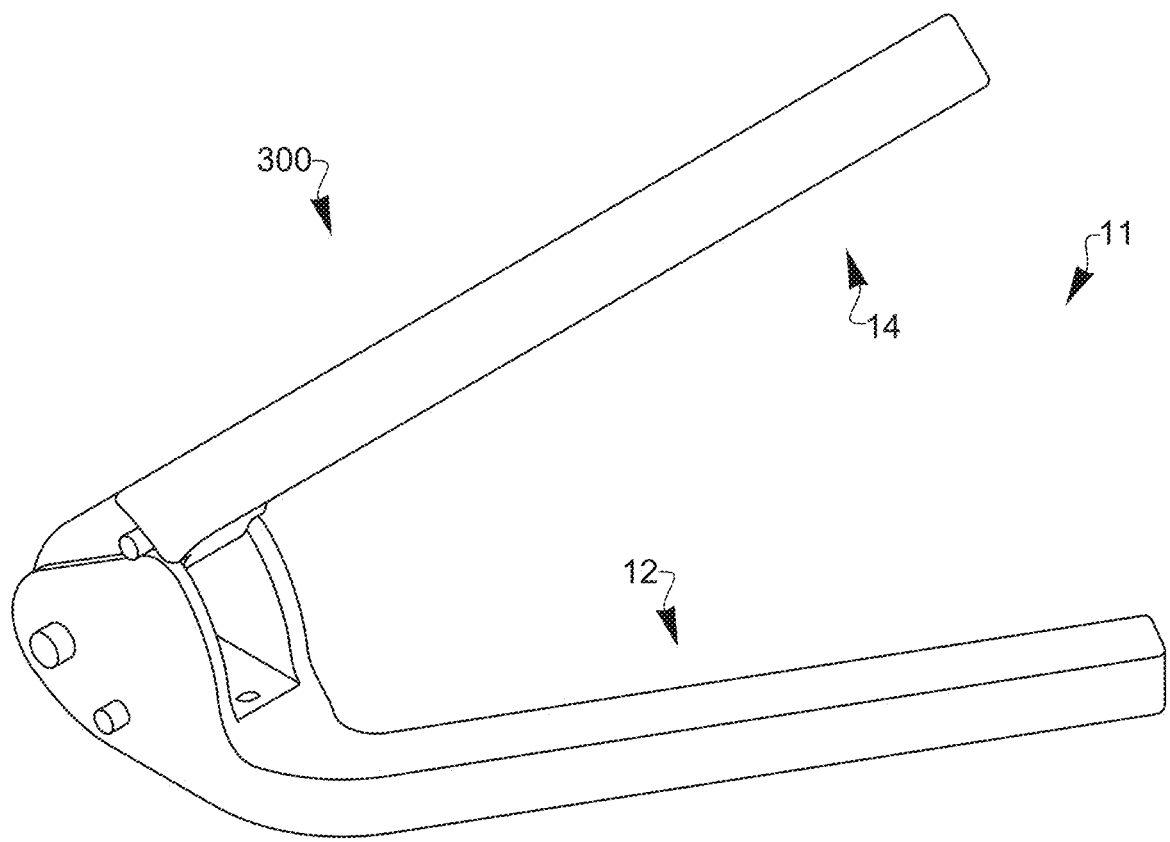
FIGS. 31A to 32 are various views of a further embodiment of a vascular clamp assembly.
Figure 31B:
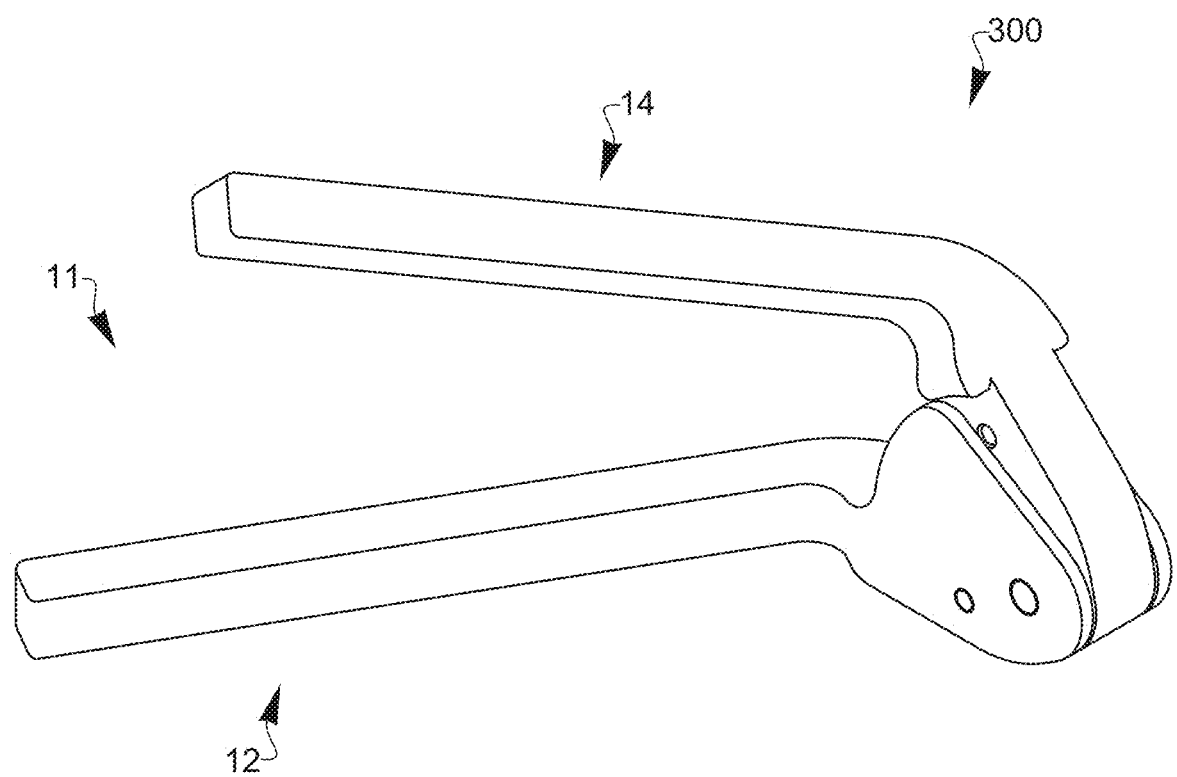
Figure 32:
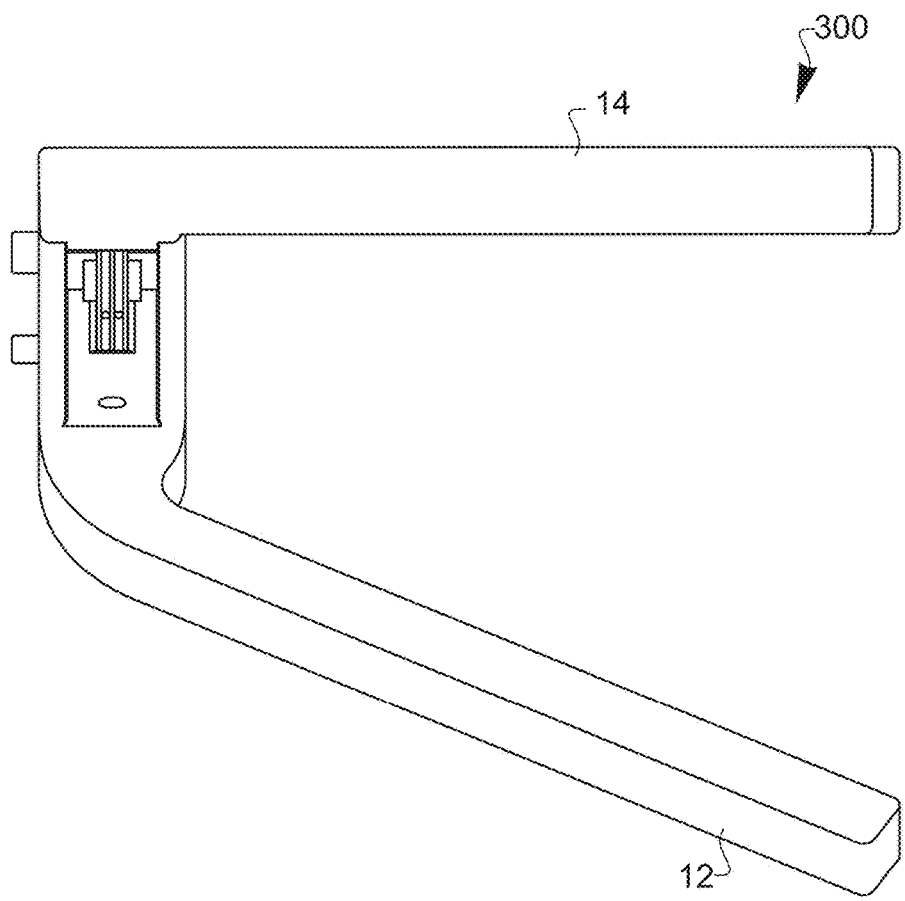
Figure 33A:
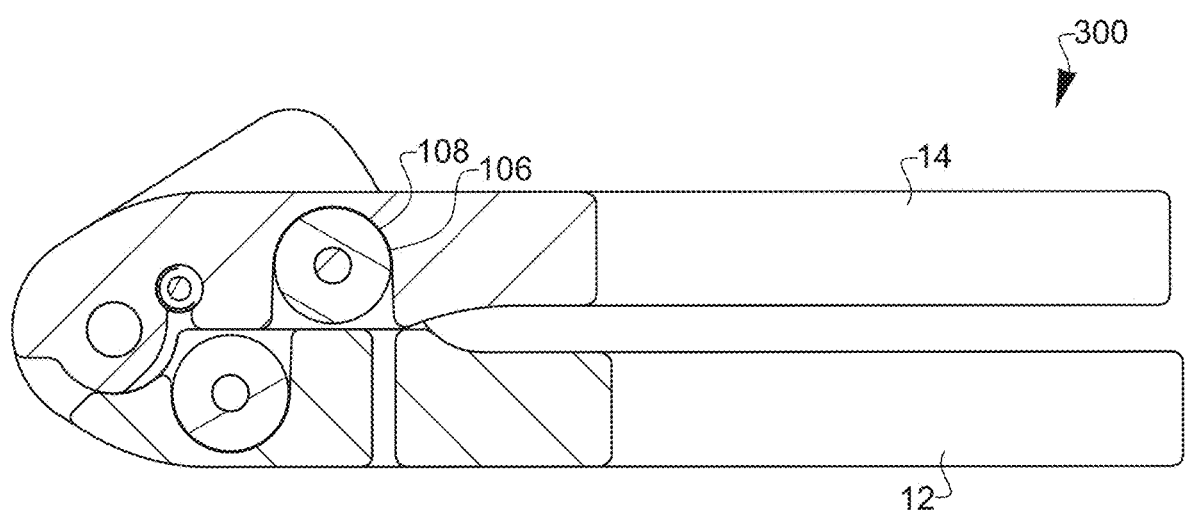
FIGS. 33A to 34 are cross-sectionals view of a portion of the embodiment of a vascular clamp assembly of FIG. 33A.
Figure 33B:
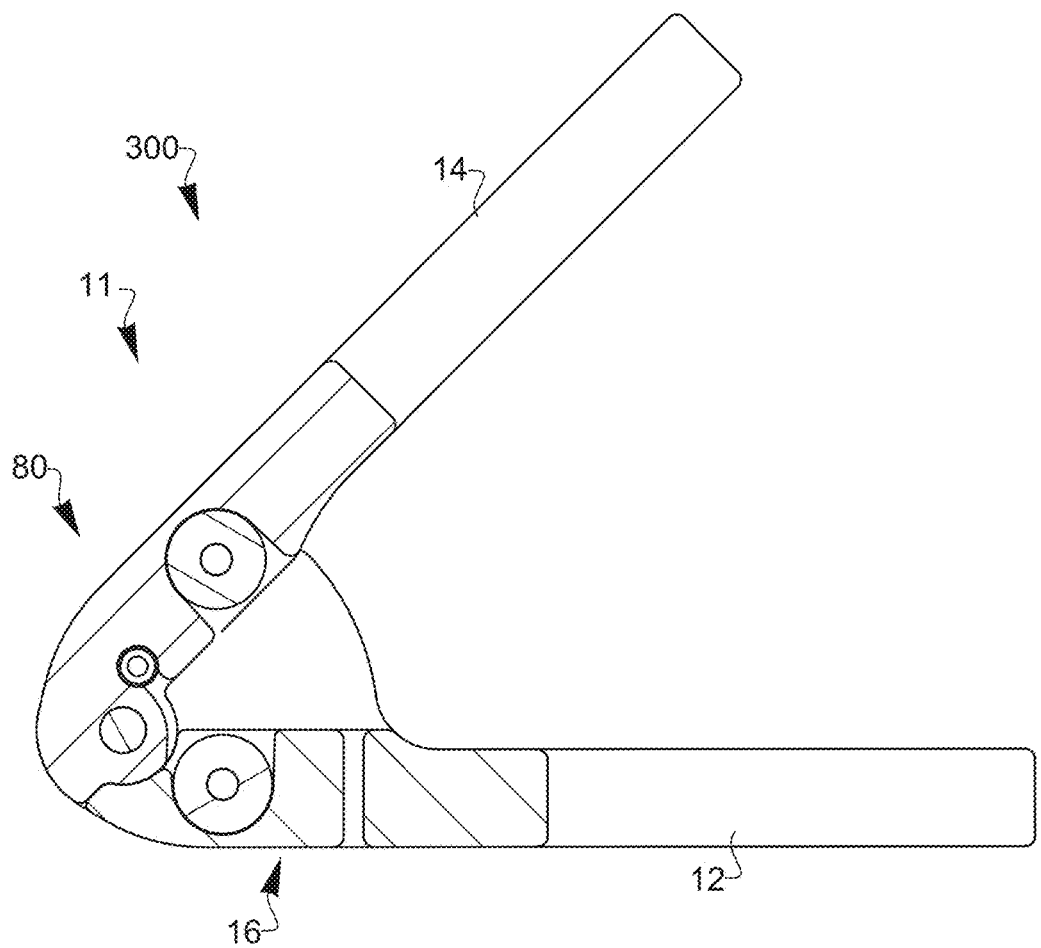
Figure 34:
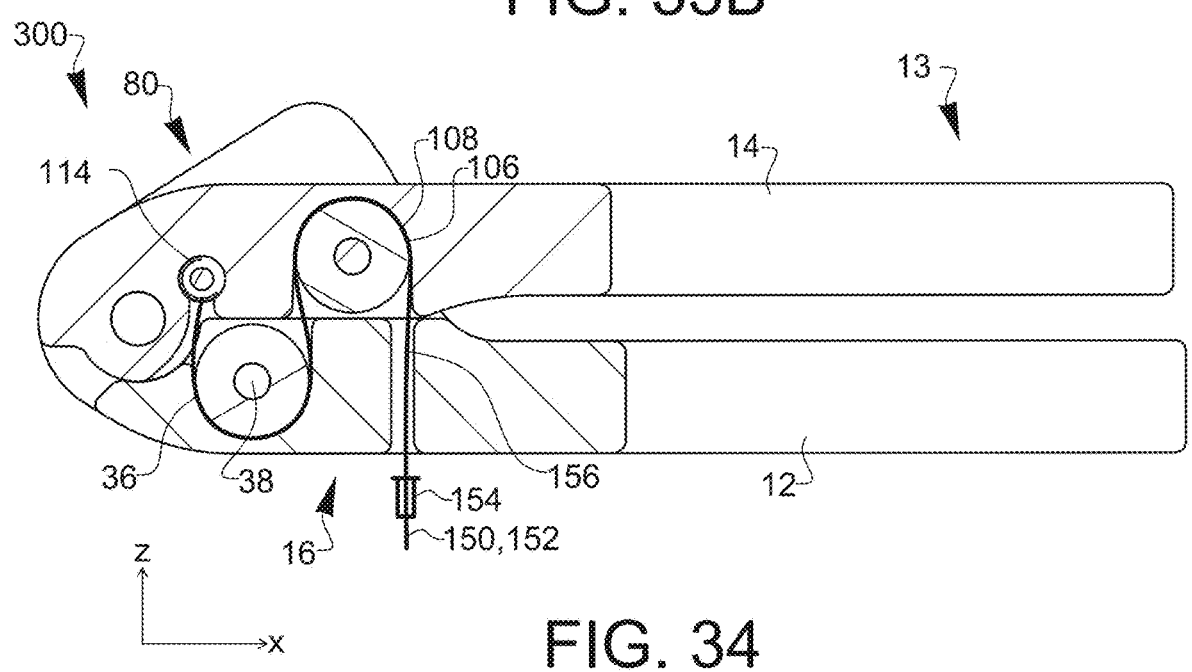
Figure 35:
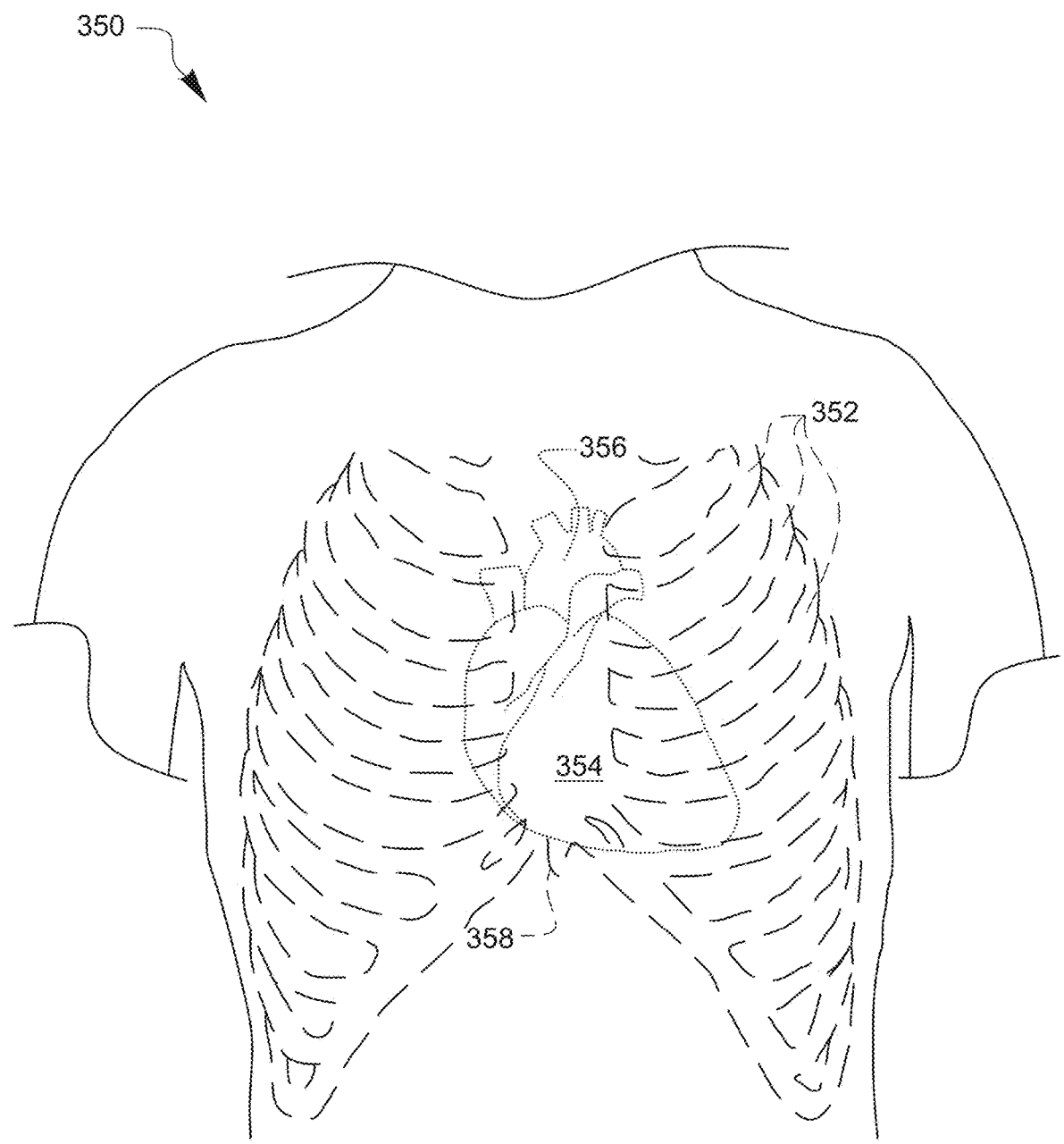
FIG. 35 schematically illustrates the relative locations of the heart and ribcage in a human thorax.
Figure 36:
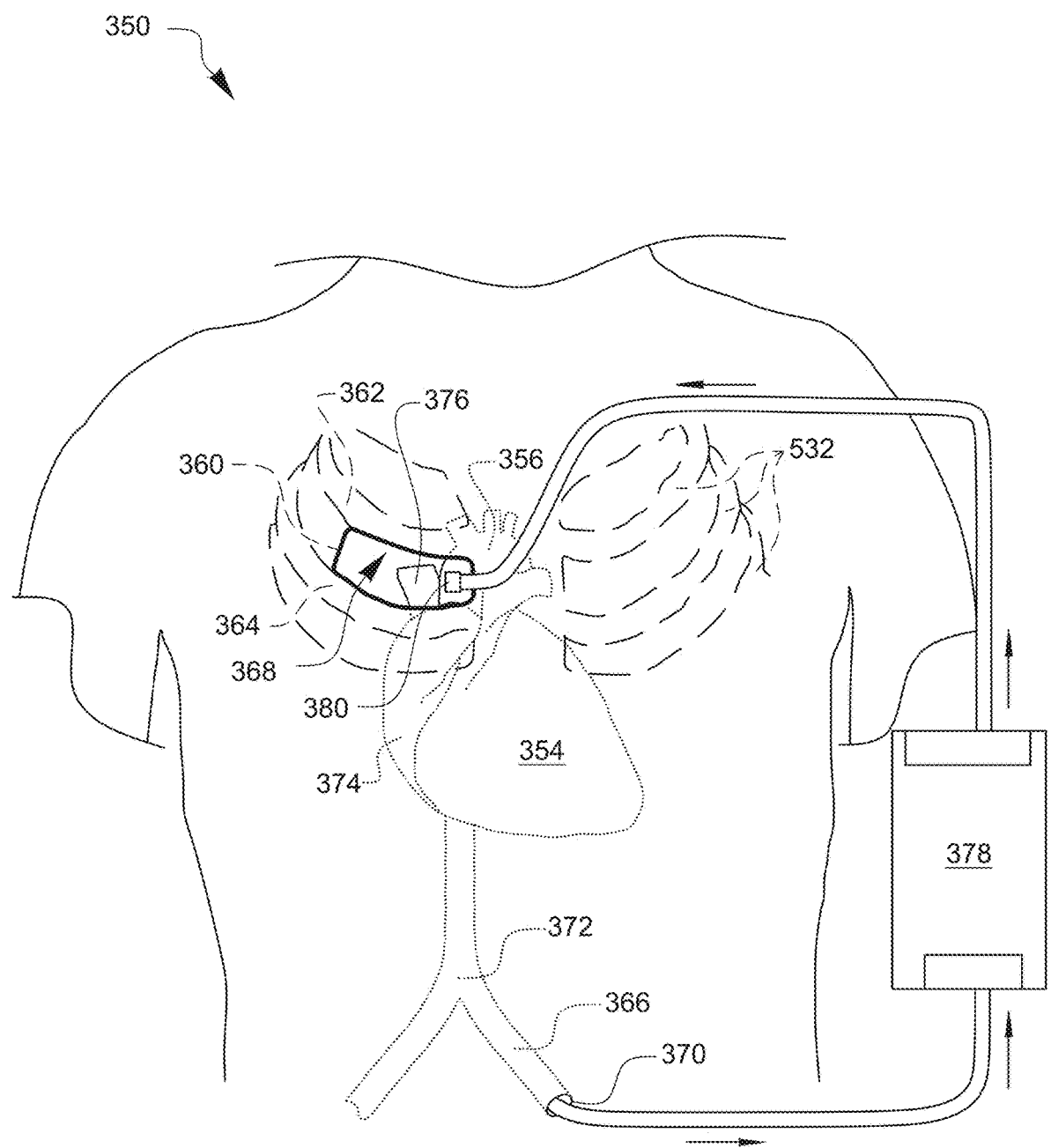
FIG. 36 schematically illustrates a cardiac surgical procedure performed through an intercostal space.

As illustrated in FIGS. 1 to 8B, an embodiment of a vascular clamp assembly 10, which may be an aortic cross clamp assembly, may include a first arm assembly 12 coupled to a second arm assembly 14. The first arm assembly 12 may be coupled to the second arm assembly 14 in any suitable manner, such as pivotably coupled to the second arm assembly 14, and the vascular clamp assembly 10 may be configured to displace between a first open configuration 11 (illustrated in the embodiment of FIGS. 31A to 32) to a second closed configuration 13 (illustrated in FIG. 1). The vascular clamp assembly 10 may be configured to be introduced to the treatment area using a delivery device assembly 200 (illustrated in FIGS. 22, 27A, 27B) and applied to a blood vessel, such as the aorta as described in reference to the CPB procedure, in the first open configuration 11, then transitioned by the delivery device assembly 22 to clamp—and prevent the flow of blood through—the blood vessel. At the end of the procedure, the vascular clamp assembly 10 may be transitioned from the second closed configuration 13 to the first open configuration 11 and removed from the blood vessel to re-establish blood flow.

Figure 10:
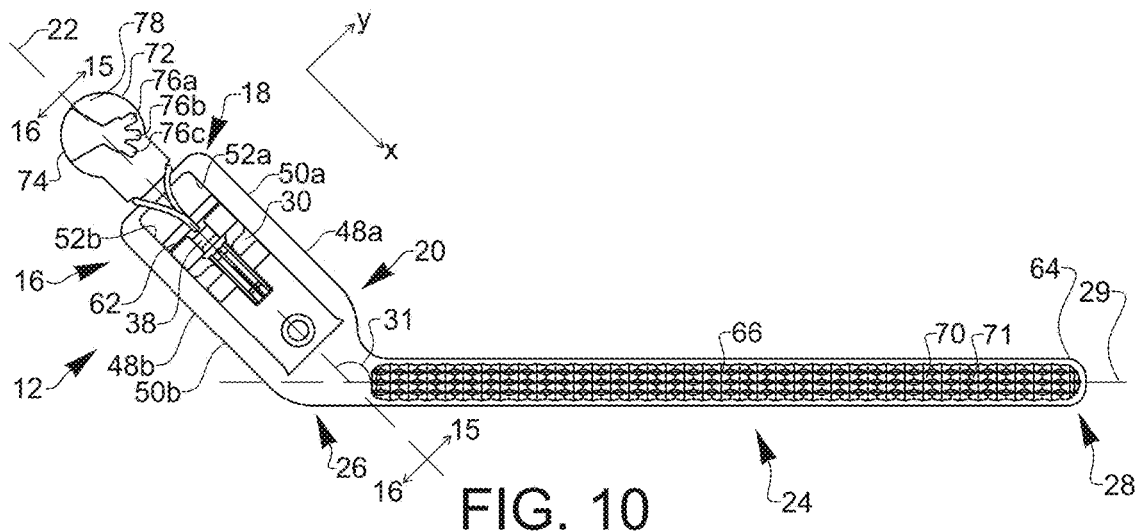
FIGS. 10 to 13 are various views of an embodiment of a first arm assembly of the vascular clamp assembly of FIG. 1.

Turning to the vascular clamp assembly 10 in more detail, the first arm assembly 12 may include a first arm body portion 16 which may be elongated and may extend from a first end 18 to a second end 20 along a first arm body axis 22, as illustrated in the top view of FIG. 10. The first arm assembly 12 may also include a first clamp arm portion 24 that extends from a first end 26 to a second end 28 along a first clamp arm axis 29, and the second end 20 of the first arm body portion 16 may be coupled to the first end 26 of the first clamp arm portion 24. In some embodiments, the first arm body axis 22 and the first clamp arm axis 29 may each be linear, and the first arm body axis 22 may not be disposed coaxially-aligned with or parallel to the first clamp arm axis 29. With reference to FIG. 10, the first arm body axis 22 may be disposed at a first arm angle 31 relative to the first clamp arm axis 29, and the first arm angle 31 may be an obtuse angle, such as an angle between 120 degrees and 150 degrees, or, more particularly, between 130 degrees and 140 degrees. In some embodiments, the first arm angle is between 80 degrees and 100 degrees, and may be substantially 90 degrees, as illustrated in the embodiment the vascular clamp assembly 300 illustrated in FIGS. 29A to 34. In still other embodiments, the first arm body axis 22 may be coaxially aligned with the first clamp arm axis 29. The first arm body axis 22 may extend along the X-axis of the reference coordinate system of FIGS. 10 and 11.

Figure 11:
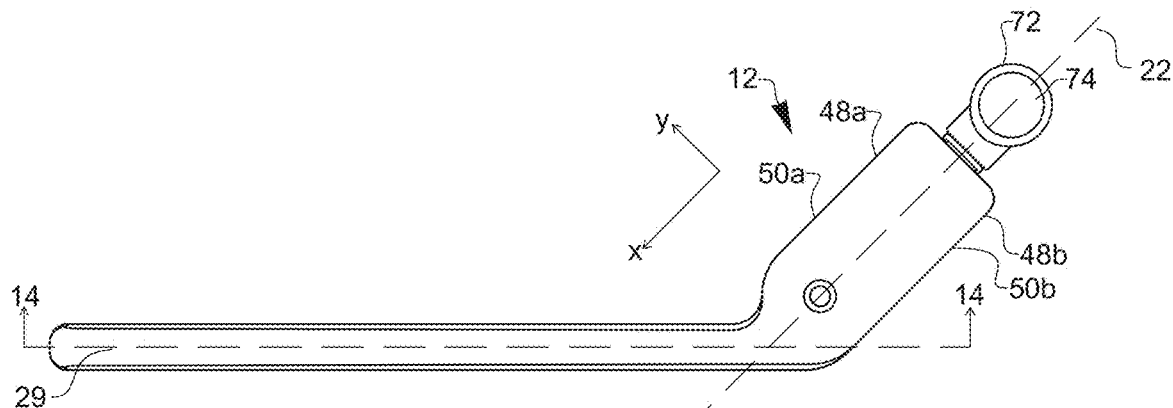
Figure 12:
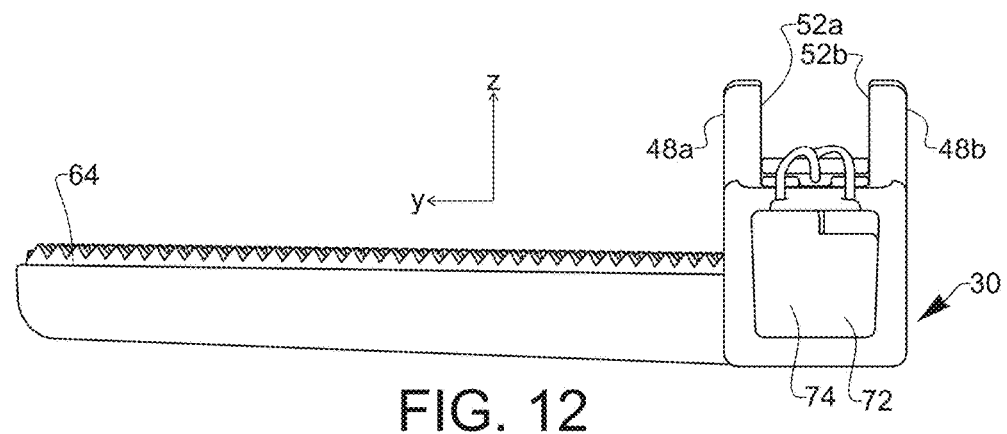
Figure 13:
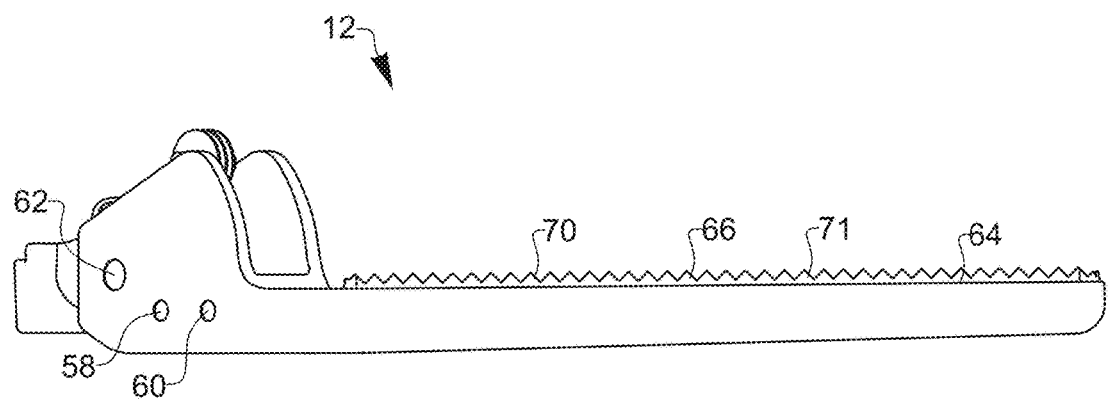
Figure 14:
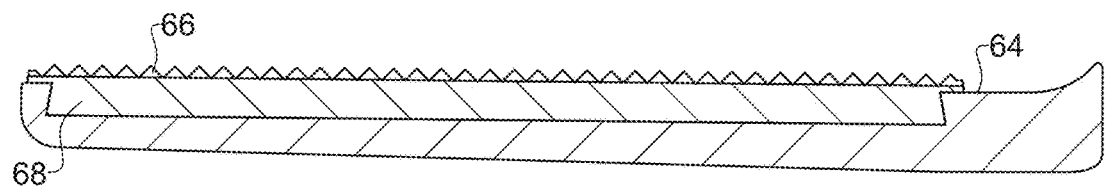
FIG. 14 is a cross-sectional view of a portion of the first arm assembly taken along section line 14-14 of FIG. 11.
Figure 15:
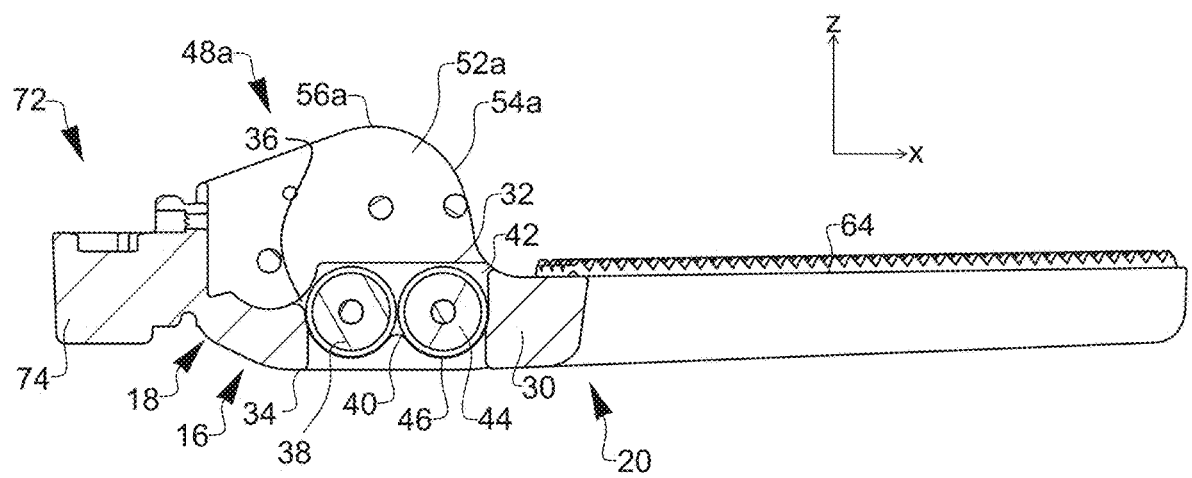
FIG. 15 is a cross-sectional view of a portion of the first arm assembly taken along section line 15-15 of FIG. 10.

Referring to the cross-sectional view of FIG. 15, the first arm body portion 16 may include an elongated first base portion 30 that extends from the first end 18 to the second end 20, and the first base portion 30 may generally extend along (or within) the X-Y plane of the reference coordinate system of FIGS. 10 and 11. The first base portion 30 may be partially defined by an upper (or inner) surface 32 and a lower (or outer) surface 34, and the upper surface 32 may be offset from the lower surface 34 along the Z-axis of the reference coordinate system of FIGS. 12 and 15. The first base portion 30 may include a first recess 36 that may be a slot formed in the first base portion 30 that extends from (or is formed in) the upper surface 32 towards the lower surface 34 generally along the along the Z-axis of the reference coordinate system of FIGS. 12 and 15. The first recess 36 may be configured to receive a first arm first pulley 38, and the first recess 36 may be defined by a lower perimeter edge 40 that is semi-circular having a diameter that is larger than a corresponding diameter of the first arm first pulley 38.

The first base portion 30 may also include a second recess 42 that may offset from the first recess 36 along the X-axis of the reference coordinate system of FIGS. 10 and 11, and the second recess 42 may be disposed between the first recess 36 and the second end 20 of the first arm body portion 16. The second recess 42 may be identical to or substantially identical to the first recess 36. That is, the second recess 42 may be a slot formed in the first base portion 30 that extends from (or is formed in) the upper surface 32 towards the lower surface 34 generally along the along the Z-axis of the reference coordinate system of FIGS. 12 and 15. The second recess 42 may be configured to receive a first arm second pulley 44, and the second recess 42 may be defined by a lower perimeter edge 46 that is semi-circular having a diameter that is larger than a corresponding diameter of the first arm second pulley 44. In some embodiments, the first recess 36 and the second recess 42 may each be portions of a single recess 36 instead of being separate recesses.

The first arm body portion 16 may include a first lateral wall 48a extending from a first lateral edge 50a of the first base portion 30 and a second lateral wall 48b extending from a second lateral edge 50a of the first base portion 30, and the first lateral edge 50a of the first base portion 30 may be separated from the second lateral edge 50a of the first base portion 30 along the along the Y-axis of the reference coordinate system of FIG. 10. The first lateral wall 48a may be planar or substantially planar and may extend from the first base portion 30 and may generally extend along the X-Z plane of the reference coordinate system of FIGS. 10 and 12. The first lateral wall 48a may be partially defined by a first inner surface 52a, and the first inner surface 52a may be planar or substantially planar, and may extend along the X-Z plane of the reference coordinate system of FIGS. 10 and 12. As illustrated in FIG. 15, the first inner surface 52a may extend in a direction along the X-axis from a first lateral end at or adjacent to the first end 18 of the first arm body portion 16 to a second lateral end at or adjacent to the second end 20 of the first arm body portion 16, and the second lateral end of the first inner surface 52a may be defined by a lateral edge 54a. The lateral edge 54a may have any suitable shape, such as an arcuate shape. The first inner surface 52a may also extend vertically (i.e., in a direction along the Z-axis) from the first base portion 30 to an upper edge 56a that may be linear or substantially linear. In some embodiments, the upper edge 56a may be sloped or angled to incline as the upper edge 56a extends from the first end 18 of the first arm body portion 16 towards the second end 20 of the first arm body portion 16, and an end portion of the upper edge 56a may be at or adjacent to an end portion of the lateral edge 54a.

Figure 16:
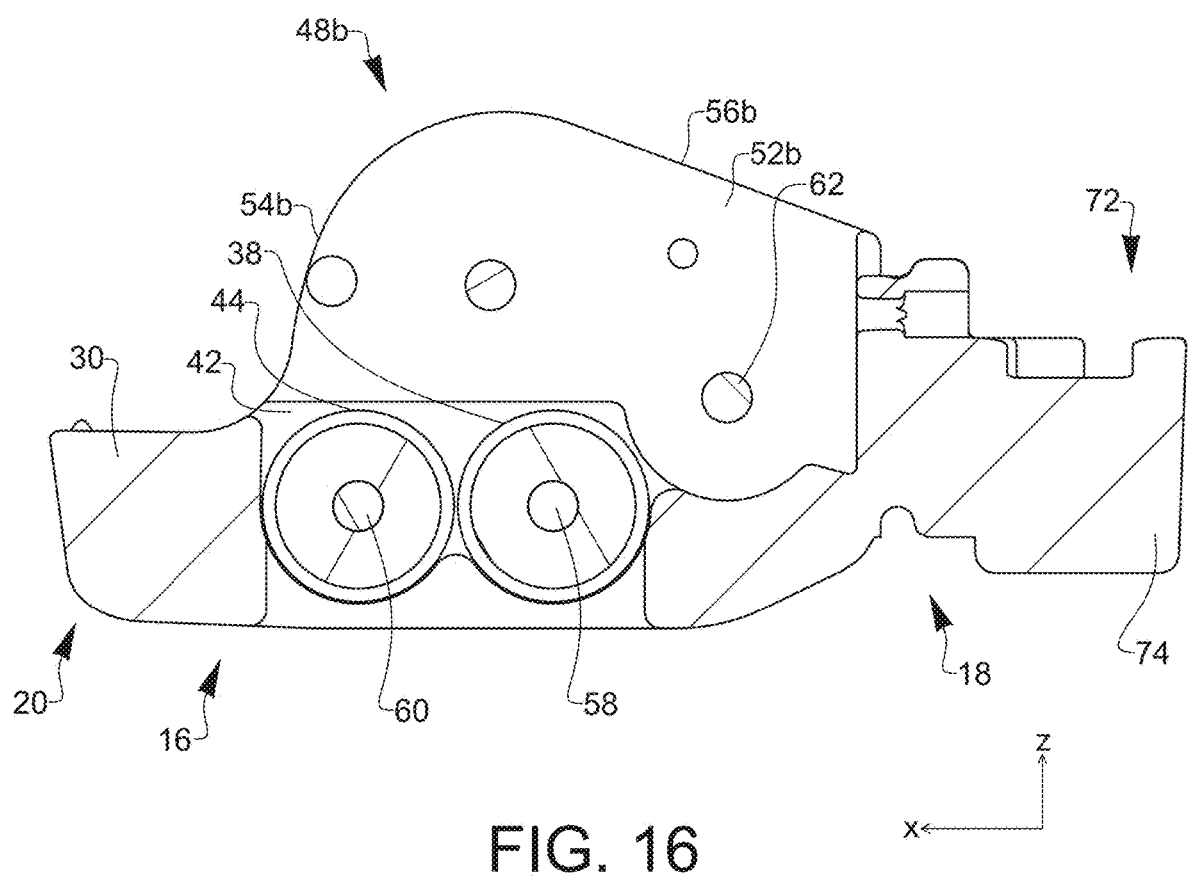
FIG. 16 is a cross-sectional view of a portion of the first arm assembly taken along section line 16-16 of FIG. 10.

As illustrated in FIG. 10, the second lateral wall 48b of the first arm body portion 16 may be identical or substantially identical to, and offset (along the Y-axis) from the first lateral wall 48a. In particular, the second lateral wall 48b may be planar or substantially planar and may extend from the first base portion 30 and may generally extend along the X-Z plane of the reference coordinate system of FIGS. 10 and 12. The second lateral wall 48b may be partially defined by a second inner surface 52b, and the second inner surface 52b may be planar or substantially planar, and may extend along the X-Z plane of the reference coordinate system of FIGS. 10 and 12. As illustrated in FIG. 16, the first inner surface 52a may extend in a direction along the X-axis from a first lateral end at or adjacent to the first end 18 of the first arm body portion 16 to a second lateral end at or adjacent to the second end 20 of the first arm body portion 16, and the second lateral end of the second inner surface 52b may be defined by a lateral edge 54b. The lateral edge 54b may have any suitable shape, such as the arcuate shape of the lateral edge 54a of the first inner surface 52a. The second inner surface 52b may also extend vertically (i.e., in a direction along the Z-axis) from the first base portion 30 to an upper edge 56b that may be linear or substantially linear. As with the upper edge 56a of the first inner surface 52a, the upper edge 56b may be sloped or angled to incline as the upper edge 56a extends from the first end 18 of the first arm body portion 16 towards the second end 20 of the first arm body portion 16, and an end portion of the upper edge 56b may be at or adjacent to an end portion of the lateral edge 54b.

The lateral edges 54a, 54b (and the corresponding first lateral wall 48a and the second lateral wall 48b) may be dimensioned and configured to extend to a portion of the second arm assembly 14 when the vascular clamp assembly 10 is in the first open configuration 11 (illustrated in the embodiment of FIGS. 31A to 32) to prevent tissue from being pinched between the first arm assembly 12 and the second arm assembly 14 when the vascular clamp assembly 10 is pivoted from the first open configuration 11 to the second closed configuration 13.

As illustrated in FIG. 10, the first arm first pulley 38 may be disposed within the first recess 36 of the first base portion 30. However, in some embodiments, the first arm first pulley 38 may be disposed at any location between the first inner surface 52a of the first lateral wall 48a and the second inner surface 52b of the second lateral wall 48b. With reference to FIG. 16, a first axle 58 may extend between a first portion of the first inner surface 52a of the first lateral wall 48a and a corresponding first portion of the second inner surface 52b of the second lateral wall 48b such that the first axle 58 extends along the Y-axis, and the first arm first pulley 38 may be rotatably disposed about the first axle 58. The first arm first pulley 38 may include a single pulley or may be an assembly of two or more pulleys that are offset along the Y-axis. Each pulley in the assembly of pulleys may rotate independently about the first axle 58 or may be fixed to the other pulleys in the assembly such that the assembly rotates as a unit.

In addition, the first arm second pulley 44 may be disposed within the second recess 42 of the first base portion 30. However, in some embodiments, the first arm second pulley 44 may be disposed at any location between the first inner surface 52a of the first lateral wall 48a and the second inner surface 52b of the second lateral wall 48b. With reference to FIG. 16, a second axle 60 may extend between a second portion the first inner surface 52a of the first lateral wall 48a and a corresponding second portion of the second inner surface 52b of the second lateral wall 48b such that the second axle 60 extends along the Y-axis and the second axle 60 is offset from the first axle 58 along the X-axis. In some embodiments, the second axle 60 is also aligned with the first axle 58 along the X-axis. The first arm second pulley 44 may be rotatably disposed about the second axle 60. The first arm second pulley 44 may include a single pulley or may be an assembly of two or more pulleys that are offset along the Y-axis. Each pulley in the assembly of pulleys may rotate independently about the second axle 60 or may be fixed to the other pulleys in the assembly such that the assembly rotates as a unit. In some embodiments, the first arm second pulley 44 may be identical to the first arm first pulley 38.

Still referring to FIG. 16, a pivot axle 62 may extend between a third portion the first inner surface 52a of the first lateral wall 48a and a corresponding third portion of the second inner surface 52b of the second lateral wall 48b such that the pivot axle 62 extends along the Y-axis. In some embodiments, the pivot axle 62 may be disposed between the first axle 58 and the first end 18 of the first base portion 30, and the pivot axle 62 may be offset from the first axle 58 (and, in some embodiments, the second axle 60) along the Z-axis. As will be described in more detail, the second arm assembly 14 may pivot about the pivot axle 62 of the first arm assembly 12 to allow the vascular clamp assembly 10 to displace between the first open configuration 11 (illustrated in the embodiment of FIGS. 31A to 32) and the second closed configuration 13 (illustrated in FIG. 1).

As previously explained, the first arm assembly 12 may also include the first clamp arm portion 24 that extends from the second end 20 of the first arm body portion 16 of the first arm assembly 12. In some embodiments, the first clamp arm portion 24 may be integrally formed with the first arm body portion 16 such that the first base portion 30 and the first and second lateral walls 48a, 48b of the first arm body portion 16 are integrally formed with the first clamp arm portion 24. In such an embodiment, the first base portion 30 and the first and second lateral walls 48a, 48b of the first arm body portion 16 and the first clamp arm portion 24 may be a single injection-molded plastic part. The first clamp arm portion 24 may have and suitable shape or combination of shapes over the length of the first clamp arm axis 29 from the first end 26 of the first clamp arm portion 24 to the second end 28 of the first clamp arm portion 24 to allow for the clamping of a suitable blood vessel when the vascular clamp assembly 10 is in the second closed configuration 13 (illustrated in FIG.

1). For example, the first clamp arm portion 24 may have a generally rectangular or square cross-sectional shape when viewed along the first clamp arm axis 29, and an upper edge of the cross-sectional shape may correspond to a first clamping surface 64 that extends along the first clamp arm axis 29 from the first end 26 of the first clamp arm portion 24 to the second end 28 of the first clamp arm portion 24, and the first clamping surface 64 may extend or generally extend along or within the X-Y plane of the reference coordinate system of FIGS. 10 and 11. In some embodiments, the first clamping surface 64 may be configured to directly engage a blood vessel, and one or more engagement features (not shown), such as patterns, projections, surface treatments, etc., may be disposed directly on the first clamping surface 64 to facilitate engagement with a blood vessel. However, a first engagement member 66 may be disposed on the first clamp arm portion 24 to cover all or a portion of the first clamping surface 64, and the first engagement member 66 may extend along the first clamp arm axis 29 from a first end at or adjacent to the first end 26 of the first clamp arm portion 24 (or at or adjacent to the first end of the first clamping surface 64) to a second end at or adjacent to the second end 28 of the first clamp arm portion 24 (or at or adjacent to the second end of the first clamping surface 64). The first engagement member 66 may have an insert portion 68 that may extend along the first clamp arm axis 29, and the insert portion 68 may be received into a channel formed in the first clamping surface 64 to secure the first engagement member 66 to the first clamp arm portion 24. The first engagement member 66 may have a first engagement surface 70 that may extends along the first clamp arm axis 29 from the first end of the first engagement member 66 to the second end of the first engagement member 66, and the first engagement surface 70 may extend or generally extend along or within the X-Y plane of the reference coordinate system of FIGS. 10 and 11. The first engagement surface 70 may include one or more engagement features 71, such as one or more serrations, protrusions, patterns, projections, surface treatments, etc., to facilitate engagement with a blood vessel. The first engagement member 66 may be made from a softer material than the first clamp arm portion 24, such as a flexible material (e.g., silicone or a TPE).

Figure 26A:
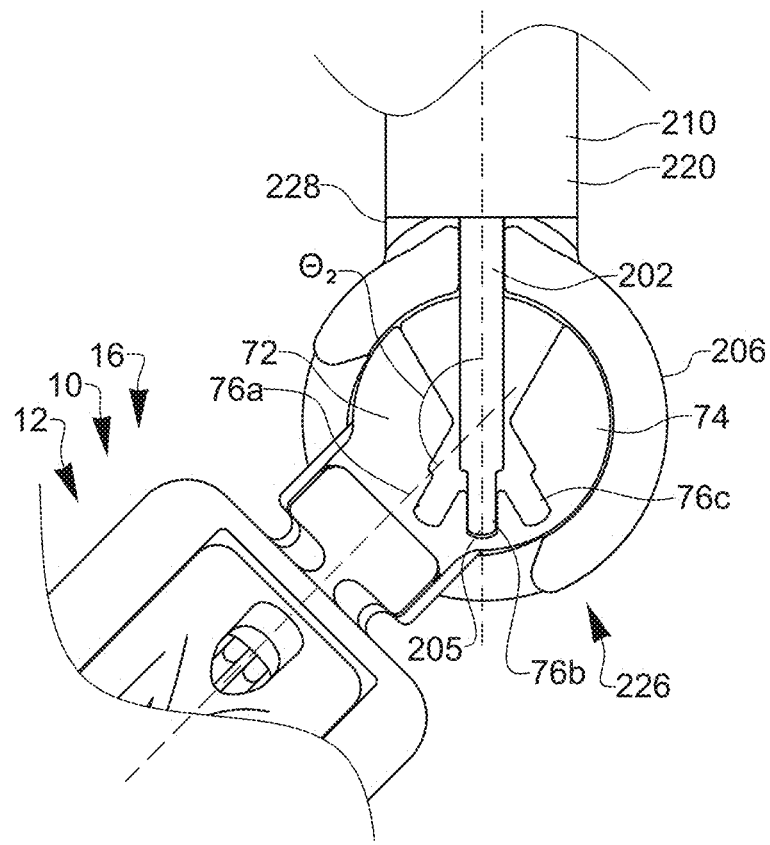

The first arm assembly 12 may also include a coupling member 72 that extends from the first end 18 of the first arm body portion 16 along or generally along the X-axis. With reference to FIG. 26A, the coupling member 72 may include a cylindrical portion 74 that may include a first linear channel 76a, a second linear channel 76b, and a third linear channel 76c that extends along an upper surface 78 of the cylindrical portion 74. Each of the first linear channel 76a, the second linear channel 76b, and the third linear channel 76c may be configured to receive a distal end 205 of an engagement rod 202 of the delivery device assembly 200 to secure the coupling member 72 within a securement portion 206 in one of three possible orientations, which will be described in more detail in a following section.

Figure 18:
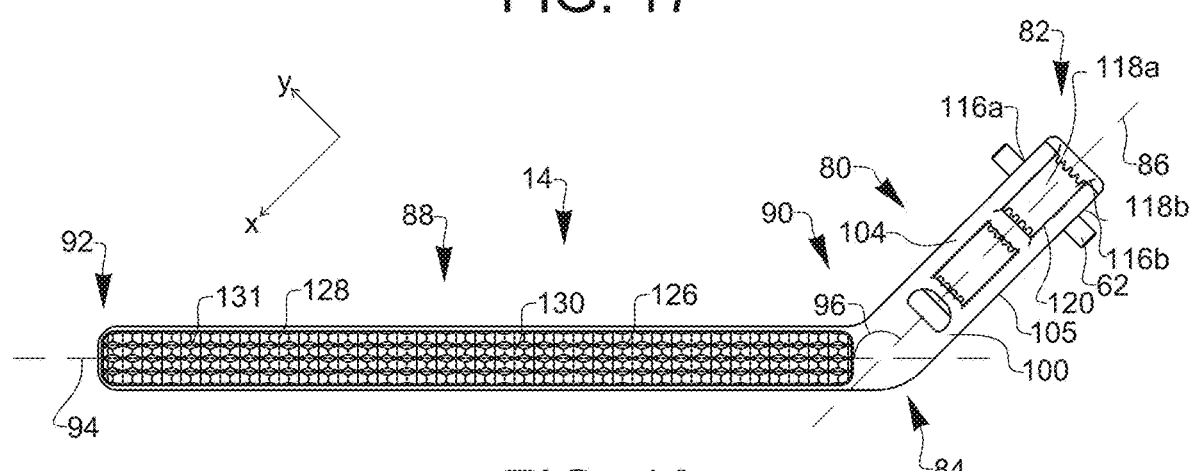
Figure 19:
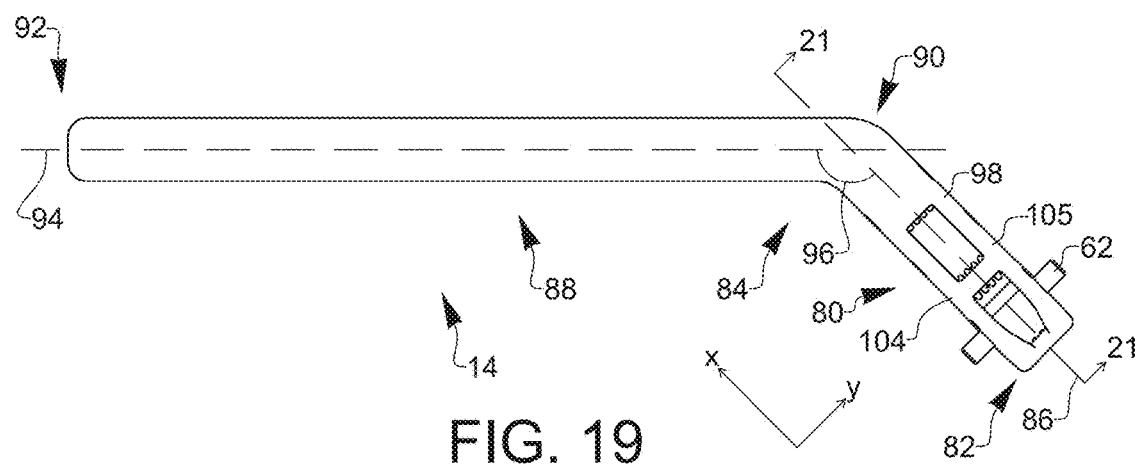
Figure 20:
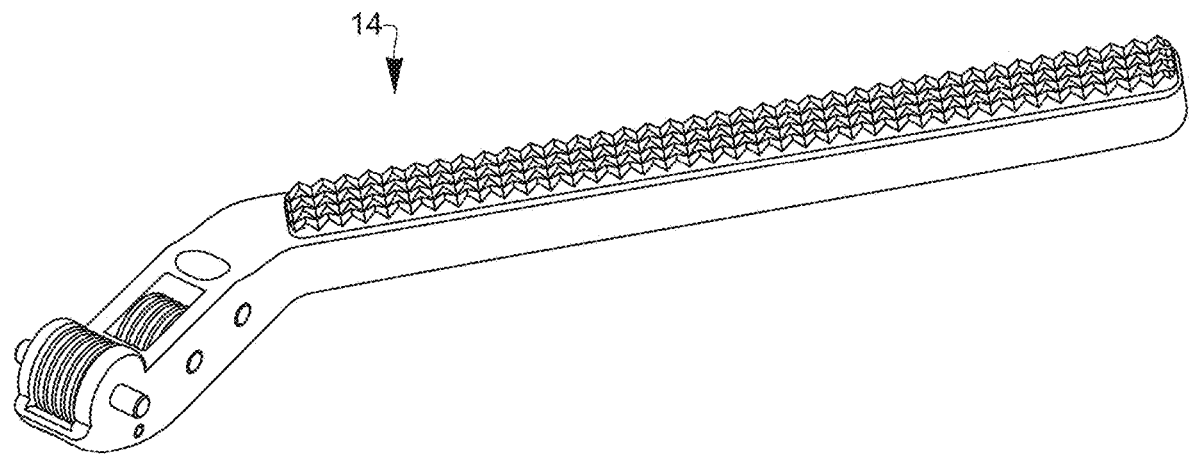

With reference to FIGS. 1 to 4, the vascular clamp assembly 10 also includes the second arm assembly 14 pivotably coupled to the first arm assembly 12. Turning to FIGS. 19, the second arm assembly 14 may include a second arm body portion 80 which may be elongated and may extend from a first end 82 to a second end 84 along a second arm body axis 86, and the second arm body axis 86 may extend along the X-axis of the reference coordinate system of FIG. 18. In some embodiments, the coupling member 72 may extend from the first end 82 of the second arm body portion 80 of the second arm assembly 14 instead of extending from the first end 18 of the first arm body portion 16.

The second arm assembly 14 may also include a second clamp arm portion 88 that extends from a first end 90 to a second end 92 along a second clamp arm axis 94, and the second end 84 of the second arm body portion 80 may be coupled to the first end 90 of the second clamp arm portion 88. In some embodiments, the second arm body axis 86 and the second clamp arm axis 94 may each be linear, and the second arm body axis 86 may not be disposed coaxially-aligned with or parallel to the second clamp arm axis 94. The second arm body axis 86 may be disposed at a second arm angle 96 relative to the second clamp arm axis 94, and the second arm angle 96 may be identical to the first arm angle 31 of the first arm assembly 12 (see FIG. 10).

Figure 17:
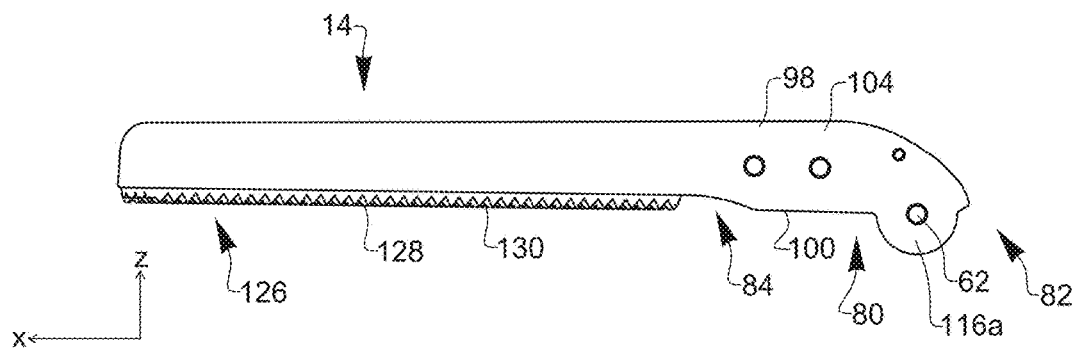
FIGS. 17 to 20 are various views of an embodiment of a second arm assembly of the vascular clamp assembly of FIG. 1.
Figure 21:
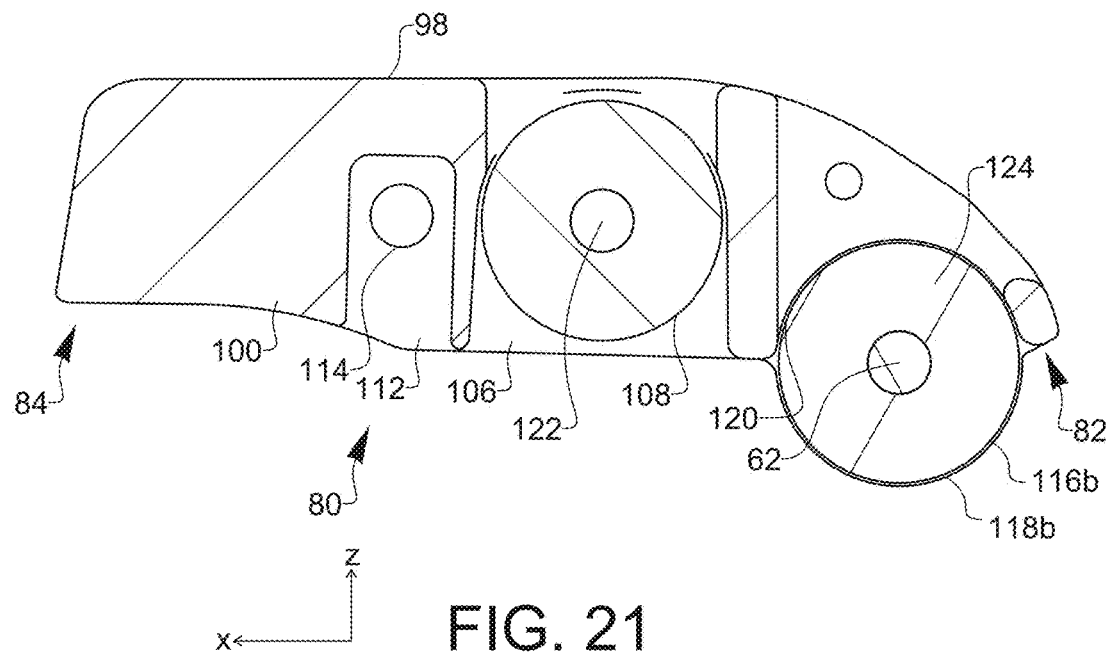
FIG. 21 is a cross-sectional view of a portion of the second arm assembly taken along section line 21-21 of FIG. 19.

Referring to the cross-sectional view of FIG. 21, [second base portion????] the second arm body portion 80 may be partially defined by an upper (or inner) surface 98 and a lower (or outer) surface 100. Each of the upper surface 98 and the lower surface 100 may extend or generally extend in or along a plane parallel to the X-Y plane of the reference coordinate system of FIGS. 18 and 19, and the upper surface 98 may be offset from the lower surface 100 along the Z-axis of the reference coordinate system of FIG. 17. The second arm body portion 80 may be further defined by a first lateral surface 104 and a second lateral surface 105. Each of the first lateral surface 104 and the second lateral surface 105 may extend or generally extend in or along a plane parallel to the X-Z plane of the reference coordinate system of FIGS. 18 and 19, and the first lateral surface 104 may be offset from the second lateral surface 105 along the Y-axis of the reference coordinate system of FIG. 17. The first lateral surface 104 and the second lateral surface 105 may be offset by a distance that is slightly less than the offset distance between the first inner surface 52a of the first lateral wall 48a of the first arm assembly 12 (see FIG. 12) and the second inner surface 52b of the second lateral wall 48b of the first arm assembly 12 such that first lateral surface 104 and the second lateral surface 105 may be disposed between the first inner surface 52a of the first lateral wall 48a of the first arm assembly 12 and the second inner surface 52b of the second lateral wall 48b of the first arm assembly 12.

The second arm body portion 80 may include a first recess 106 that may be a slot formed in the second arm body portion 80 that extends from (or formed in) the lower surface 100 towards the upper surface 98 generally along the along the Z-axis of the reference coordinate system of FIG. 21. The first recess 106 may be configured to receive a second arm first pulley 108, and the first recess 106 may be defined by an upper perimeter edge that may be semi-circular having a diameter that is larger than a corresponding diameter of the second arm first pulley 108. The second arm body portion 80 may also include a second recess 112 that may be a slot formed in the second arm body portion 80 that extends from (or is formed in) the lower surface 100 towards the upper surface 98 generally along the Z-axis of the reference coordinate system of FIG. 21. The second recess 112 may be configured to receive an anchor post 114 that may extend through the second recess 112 and along the Y-axis of the of the reference coordinate system. The second recess 112 that may offset from the first recess 106 along the X-axis of the reference coordinate system, and the second recess 112 may be disposed between the first recess 106 and the second end 84 of the second arm body portion 80. In some embodiments, the first recess 106 and the second recess 112 may each be portions of a single recess 106 instead of being separate recesses.

The second arm body portion 80 may include a first lateral tab 116a extending from the lower surface 100 along the first lateral surface 104 and a second lateral tab 116b extending from the lower surface 100 along the second lateral surface 105, and each of the first lateral tab 116a and the second lateral tab 116b may extend in or along a plane parallel to the X-Z plane of the reference coordinate system of FIG. 21. Each of the first lateral tab 116a and the second lateral tab 116b may be defined by one or more perimeter edge, such as a semi-circular perimeter edge. An inner surface 118a, 118b of each of the first lateral tab 116a and the second lateral tab 116b, respectively, may partially define a hinge recess 120 that is disposed between the inner surfaces 118a, 118b. An aperture may extend though each of the first lateral tab 116a and the second lateral tab 116b, and the pivot axle 62 may extend through the apertures (and through the hinge recess 120) such that the second arm assembly 14 may rotate about the pivot axle 62 relative to the first arm assembly 12, and vice versa.

As illustrated in FIG. 21, the second arm first pulley 108 may be disposed within the first recess 106 of the second arm body portion 80. In particular, a third axle 122 may extend between a portion of an inner surface of the first lateral surface 104 and a corresponding inner surface of the second lateral surface 105 such that the third axle 122 extends along the Y-axis, and the second arm first pulley 108 may be rotatably disposed about the third axle 122. The second arm first pulley 108 may include a single pulley or may be an assembly of two or more pulleys that are offset along the Y-axis. Each pulley in the assembly of pulleys may rotate independently about the third axle 122 or may be fixed to the other pulleys in the assembly such that the assembly rotates as a unit.

In addition, a second arm second pulley 124 may be disposed within the hinge recess 120 of the second arm body portion 80. In particular, the pivot axle 62 may extend along the Y-axis of the reference coordinate system, and the second arm second pulley 124 may be rotatably disposed about the pivot axle 62. The second arm second pulley 124 may include a single pulley or may be an assembly of two or more pulleys that are offset along the Y-axis. Each pulley in the assembly of pulleys may rotate independently about the pivot axle 62 or may be fixed to the other pulleys in the assembly such that the assembly rotates as a unit. In some embodiments, the second arm second pulley 124 may be identical to the second arm first pulley 108.

As previously explained, the second arm assembly 14 may also include the second clamp arm portion 88 that extends from the second end 84 of the second arm body portion 80 of the second arm assembly 14. In some embodiments, the second clamp arm portion 88 may be integrally formed with the second arm body portion 80, and the second arm body portion 80 and the second clamp arm portion 88 may be a single injection-molded plastic part. The second clamp arm portion 88 may have and suitable shape or combination of shapes over the length of the second clamp arm axis 94 from the first end 90 of the second clamp arm portion 88 to the second end 92 of the second clamp arm portion 88 to allow for the clamping of a suitable blood vessel when the vascular clamp assembly 10 is in the second closed configuration 13 (illustrated in FIG. 1). For example, the second clamp arm portion 88 may have a generally rectangular or square cross-sectional shape when viewed along the second clamp arm axis 94, and a lower edge of the cross-sectional shape may correspond to a second clamping surface 126 that extends along the second clamp arm axis 94 from the first end 90 of the second clamp arm portion 88 to the second end 92 of the second clamp arm portion 88, and the second clamping surface 126 may extend or generally extend along or within the X-Y plane of the reference coordinate system of FIG. 18.

In some embodiments, the second clamping surface 126 may be configured to directly engage a blood vessel, and one or more engagement features (not shown), such as patterns, projections, surface treatments, etc., may be disposed directly on the second clamping surface 126 to facilitate engagement with a blood vessel. However, a second engagement member 128 may be disposed on the second clamp arm portion 88 to cover all or a portion of the second clamping surface 126, and the second engagement member 128 may be identical or substantially identical to the first engagement member 66 of the first clamp arm portion 24. That is, the second clamping surface 126 may extend along the second clamp arm axis 94 from a first end at or adjacent to the first end 90 of the second clamp arm portion 88 (or at or adjacent to the first end of the second clamping surface 126) to a second end at or adjacent to the second end 92 of the second clamp arm portion 88 (or at or adjacent to the second end of the second clamping surface 126). The second engagement member 128 may have an insert portion (not shown) that may be identical to the insert portion 68 of the first engagement member 66, and the insert portion may be received into a channel formed in the second clamping surface 126 to secure the second engagement member 128 to the second clamp arm portion 88. The second engagement member 128 may have a second engagement surface 130 that may extend along the second clamp arm axis 94 from the first end of the second engagement member 128 to the second end of the second engagement member 128, and the second engagement surface 130 may extend or generally extend along or within the X-Y plane of the reference coordinate system of FIG. 18. The second engagement surface 130 may include one or more engagement features 131, such as one or more serrations, protrusions, patterns, projections, surface treatments, etc., to facilitate engagement with a blood vessel. The second engagement member 128 may be made from a softer material than the second clamp arm portion 88, such as a flexible material (e.g., silicone or a TPE).

Figure 1:
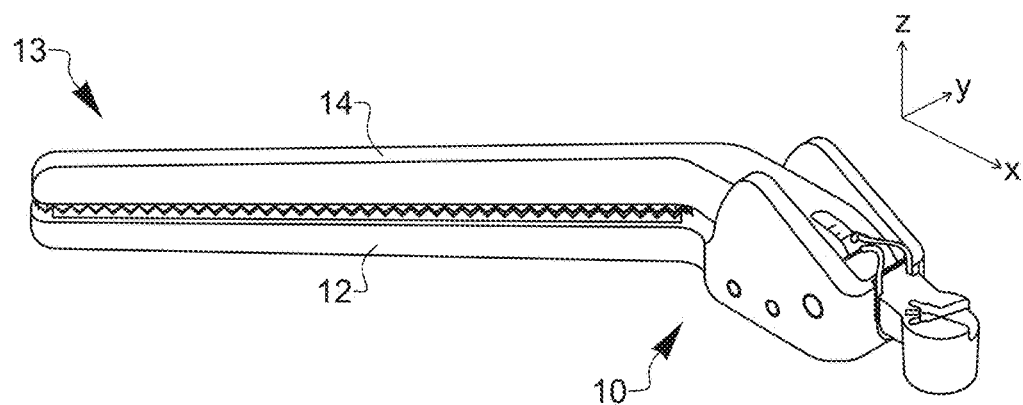
FIGS. 1 to 8B are various views of an embodiment of a vascular clamp assembly.
Figure 2:
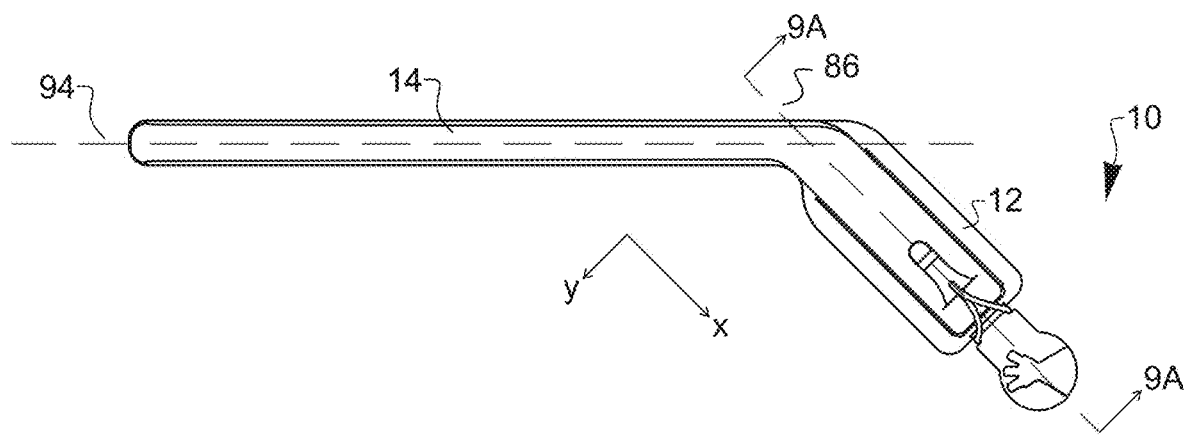
Figure 3:
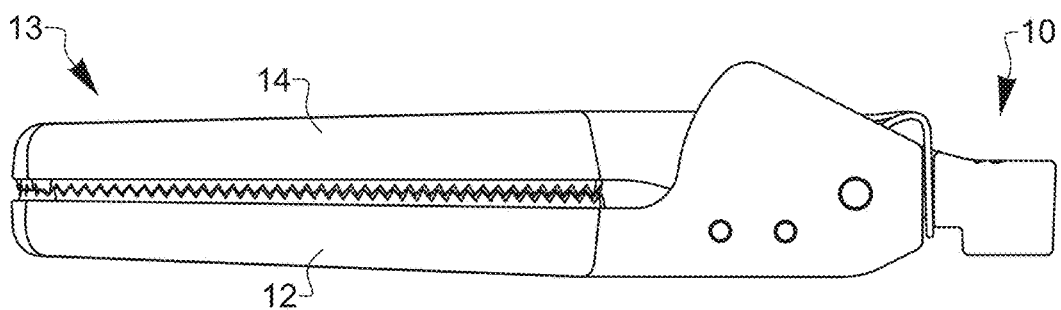
Figure 4:
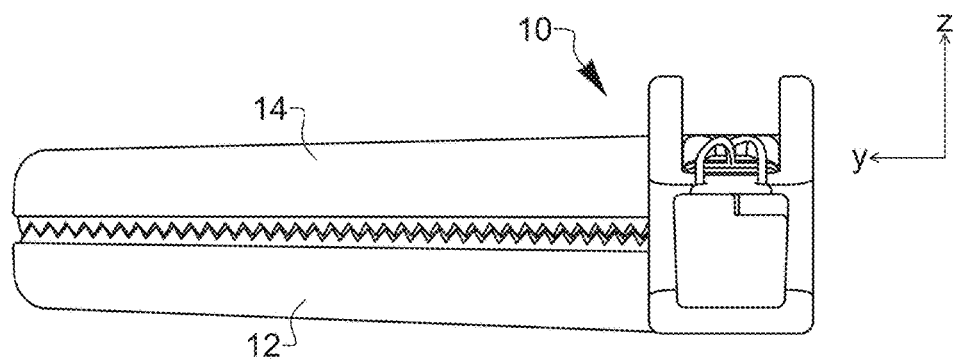
Figure 5:
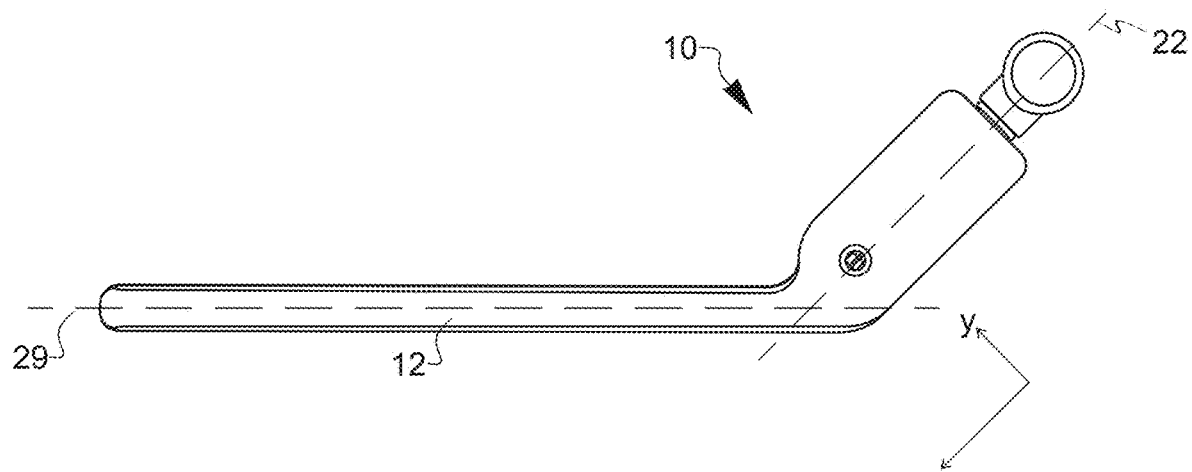
Figure 6:
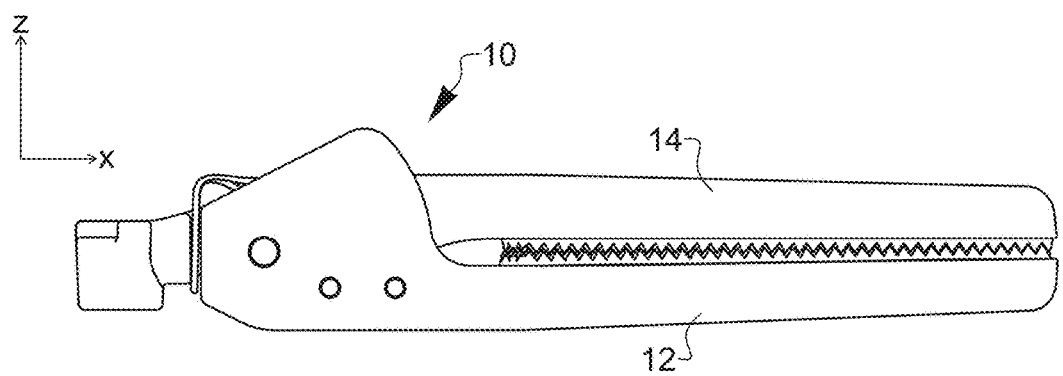
Figure 7:
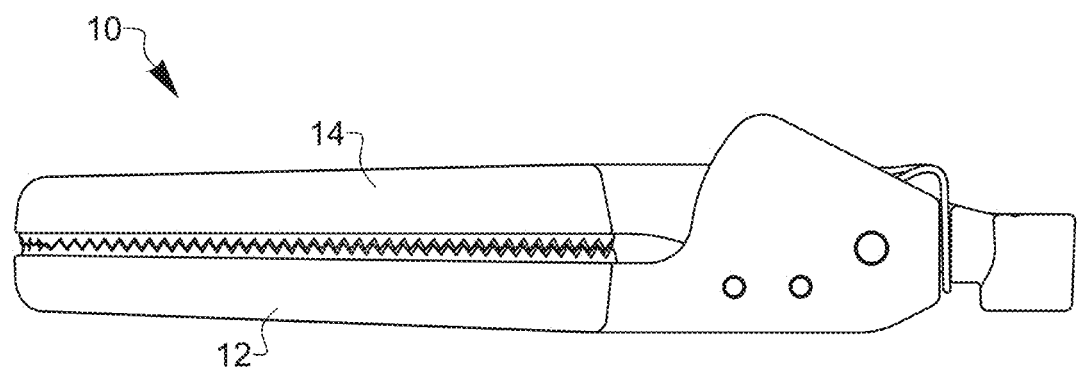
Figure 8A:
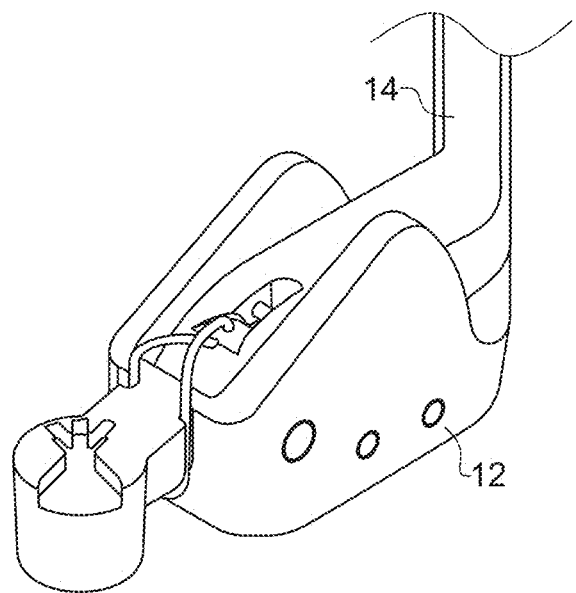
Figure 8B:
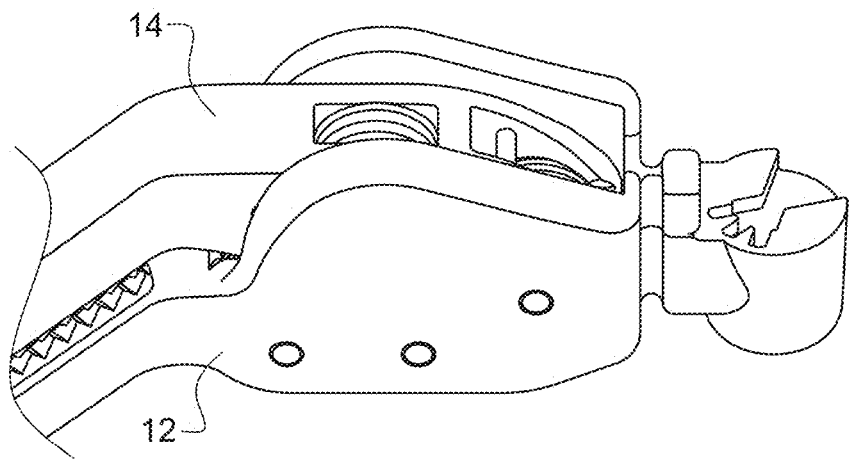
Figure 9A:
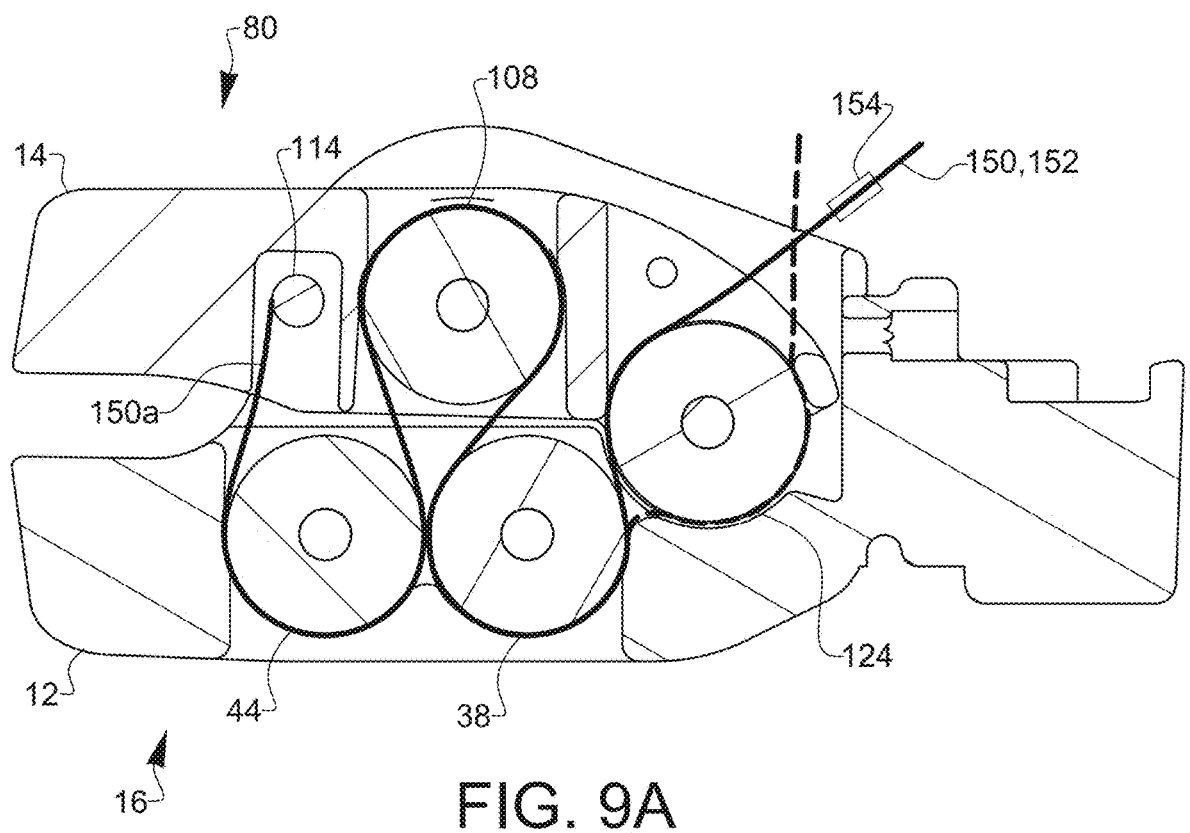
FIG. 9A is a cross-sectional view of the embodiment of the vascular clamp assembly of taken along section line 9A-9A of FIG. 2.
Figure 9B:
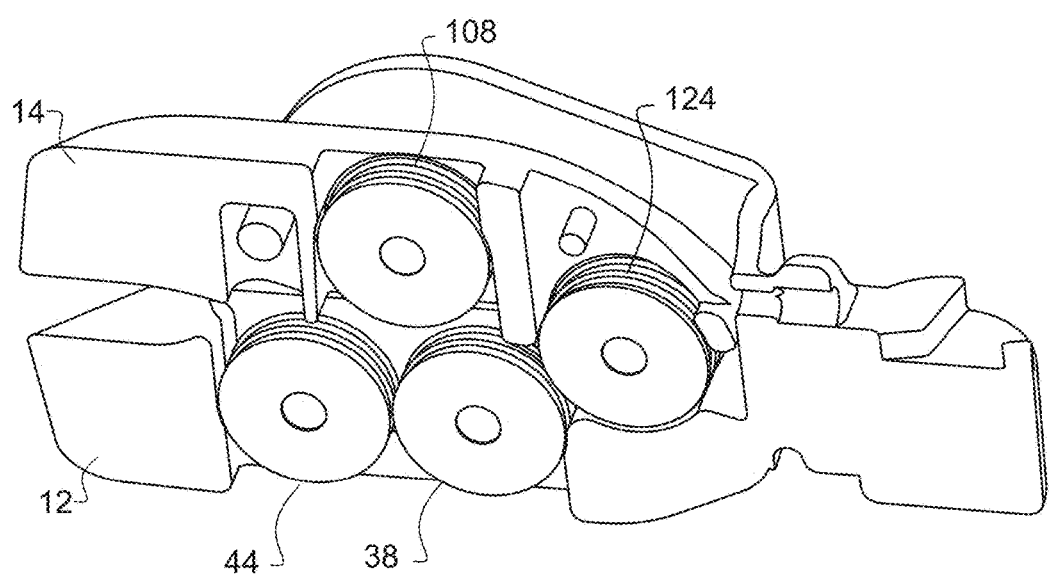
FIG. 9B is a perspective view of the cross-sectional view of FIG. 9A.

The first arm assembly 12 and the second arm assembly 14 may be configured such that the second clamping surface 126 of the second arm assembly 14 and the first clamping surface 64 of the first arm assembly 12 may be parallel and offset in the Z-direction of the reference coordinate system of FIG. 4 when the vascular clamp assembly 10 is in the second closed configuration 13 (illustrated in FIG. 1) when a blood vessel is not disposed between the first arm assembly 12 and the second arm assembly 14. In such a configuration, all or substantially all of the second engagement surface 130 of the second engagement member 128 of the second arm assembly 14 may be in contact with all or substantially all of the first engagement surface 70 of the first engagement member 66 of the first arm assembly 12 (illustrated in FIG. 10), as illustrated in FIGS. 1 to 10. In other embodiments, all or only a portion of the second engagement surface 130 of the second engagement member 128 of the second arm assembly 14 may be in contact with all or only a portion of the first engagement surface 70 of the first engagement member 66 of the first arm assembly 12 (illustrated in FIG. 10). In other embodiments, the second engagement surface 130 of the second engagement member 128 of the second arm assembly 14 may be parallel to and offset with (along the Z-axis of the reference coordinate system) the first engagement surface 70 of the first engagement member 66 of the first arm assembly 12 (illustrated in FIG. 10) when no blood vessel is disposed between the first arm assembly 12 and the second arm assembly 14. In still other embodiments, the second clamping surface 126 of the second arm assembly 14 and the first clamping surface 64 of the first arm assembly 12 may be non-parallel and offset in the Z-direction of the reference coordinate system of FIG. 4 when the vascular clamp assembly 10 is in the second closed configuration 13 (illustrated in FIG. 1) when a blood vessel is not disposed between the first arm assembly 12 and the second arm assembly 14. For example, one or both of the second clamping surface 126 of the second arm assembly 14 and the first clamping surface 64 of the first arm assembly 12 may not be disposed in the X-Y plane of the reference coordinate system of FIG. 4 when the vascular clamp assembly 10 is in the second closed configuration 13 (illustrated in FIG. 1) when a blood vessel is not disposed between the first arm assembly 12 and the second arm assembly 14.

Figure 22:
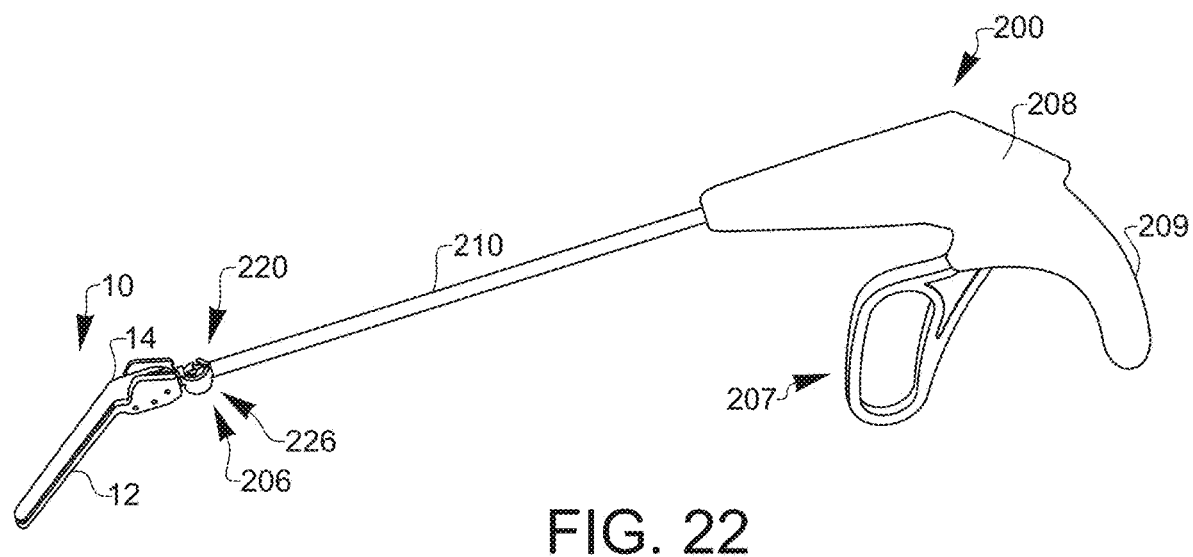
FIG. 22 is a perspective view of an embodiment of a delivery device assembly configured to introduce the vascular clamp assembly of FIG. 1.
Figure 23:
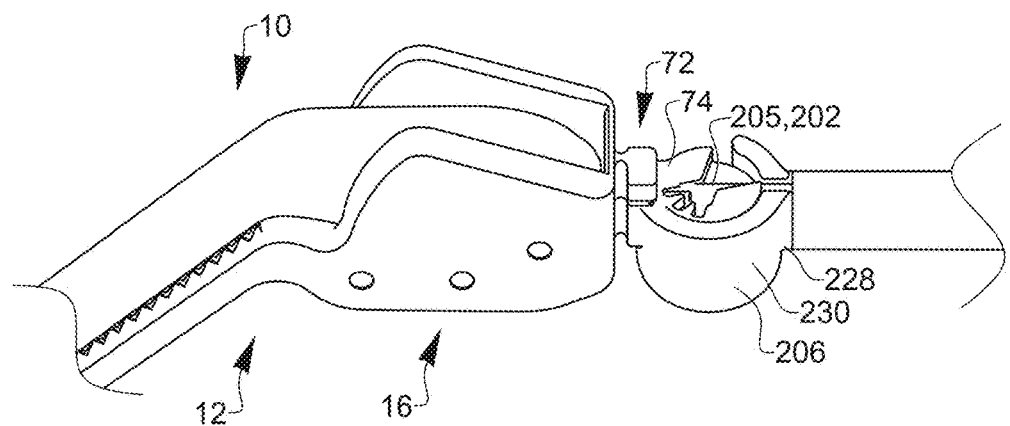
FIGS. 23 to 26c are various views of portions of the embodiment of the delivery device assembly of FIG. 22.
Figure 24:
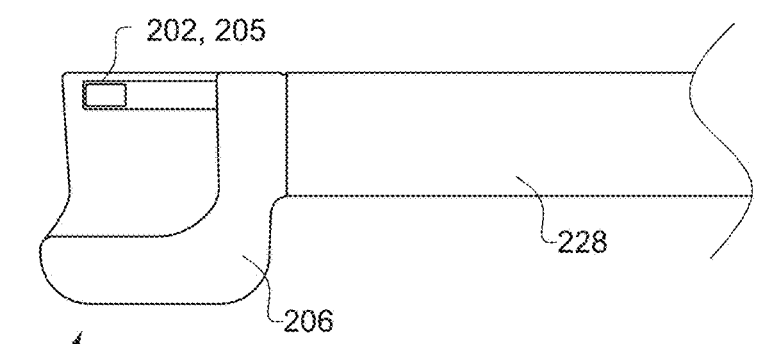
Figure 28A:
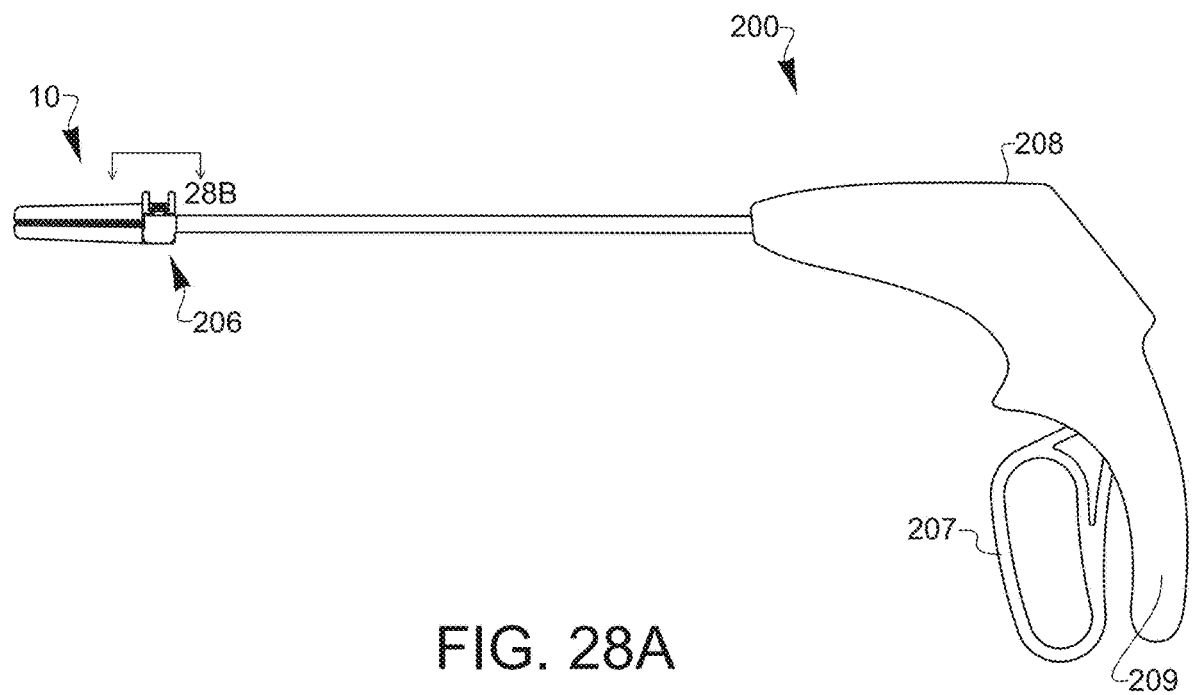

With reference to FIG. 22, the delivery device assembly 200 may include a housing portion 208 having a grip portion 209 that is adapted to be grasped by a user to engage and displace an actuation lever 207 from a first lever position to a second lever position (illustrated in FIG. 28A). Turing to FIG. 27A (in which a portion of the housing portion 208 is omitted for clarity), a first portion of the actuation lever 207 may be rotatably coupled to the housing portion 208 at a first portion (e.g., a pivot point) of the housing portion 208 such that the actuation lever 207 pivots between the first lever position to the second lever position about the pivot point. The actuation lever 207 may pivot about a pivot axis that may extend through the pivot point and may be normal to a shaft axis 221 that extends along a shaft 210 that is coupled to the housing portion 208. In particular, the first portion of the actuation lever 207 may be a pair of aligned bosses that are received into corresponding cylindrical internal walls that are each formed on a corresponding interior portion of the housing portion 208 at the pivot point of the housing portion 208. A portion 212 of the actuation lever 207 may contact a portion 214 of the housing portion 208 when the actuation lever 207 is in the first lever position to prevent the actuation lever 12 from overextending beyond the first lever position. A first end of a spring 216 may be coupled to a portion of the actuation lever 207 and a second end of the spring 216 may be coupled to a portion of the interior portion of the housing portion 208 such that the actuation lever 207 is biased into the first lever position by the spring 216.

The delivery device assembly 200 may also include the shaft 210 that extends from a proximal end 218 to a distal end 220 along the shaft axis 221, and the shaft axis 221 may be linear. One or more portions of the shaft 210 may be coupled to a second portion of the housing portion 208 such that the shaft 210 may be fixed relative to the housing portion 208. However, one or more portions of the shaft 210 may be rotatably coupled to the second portion of the housing portion 208 such that the shaft 210 rotates relative to the housing portion 208 about the shaft axis 221. The shaft 210 may be rigid, but in other embodiments, the shaft 210 may be flexible or may have one or more portions that are flexible.

The shaft 210, or one or more portions of the shaft 210, may have the general shape of an elongated hollow tube having an interior surface 222 (illustrated in the cross-section of FIG. 27A) that defines an interior portion 224 that extends from the proximal end 218 to the distal end 220 of the shaft 210. The shaft 210 and the interior surface 222 may have any suitable cross-sectional shape or combination of shapes normal to the shaft axis 221. For example, the shaft 210 may have the general shape of an elongated cylinder, and the interior surface 222 may have a circular cross-sectional shape when viewed normal to the shaft axis 221.

The delivery device assembly 200 also includes a securement assembly 226 disposed or coupled to the distal end 220 of the shaft 210. The securement assembly 226 may include the securement portion 206 that may be coupled to a coupling portion 228 that may extend along a longitudinal axis that may be coaxially-aligned with the shaft axis 221, and at least part (i.e., a proximal portion) of the coupling portion 228 may be configured to be received into a portion of the interior portion 224 of the shaft 210 that is at or adjacent to the distal end 220 of the shaft 210. The securement portion 206 may include a cylindrical circumferential wall 230 and a bottom surface 232 at an end of the circumferential wall 230.

Figure 25:
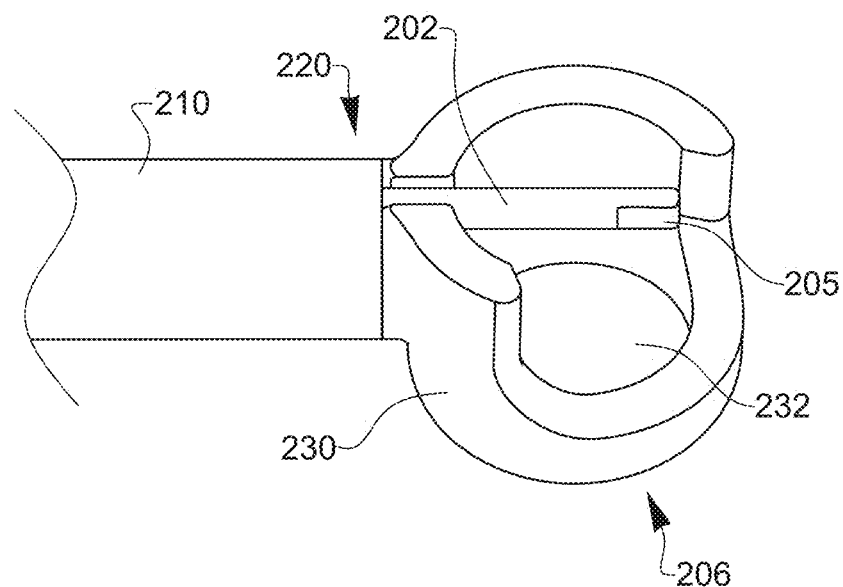
Figure 29A:
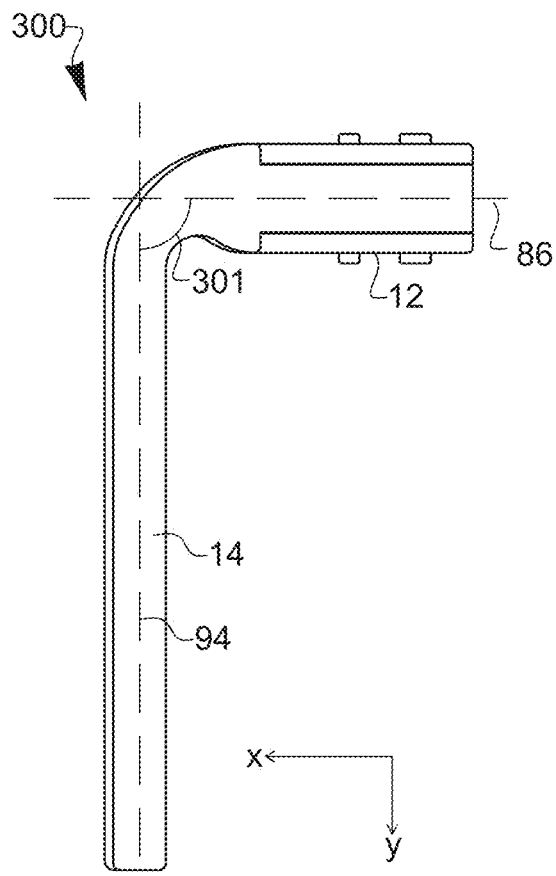
FIGS. 29A to 30 are various views of a further embodiment of a vascular clamp assembly.
Figure 29B:
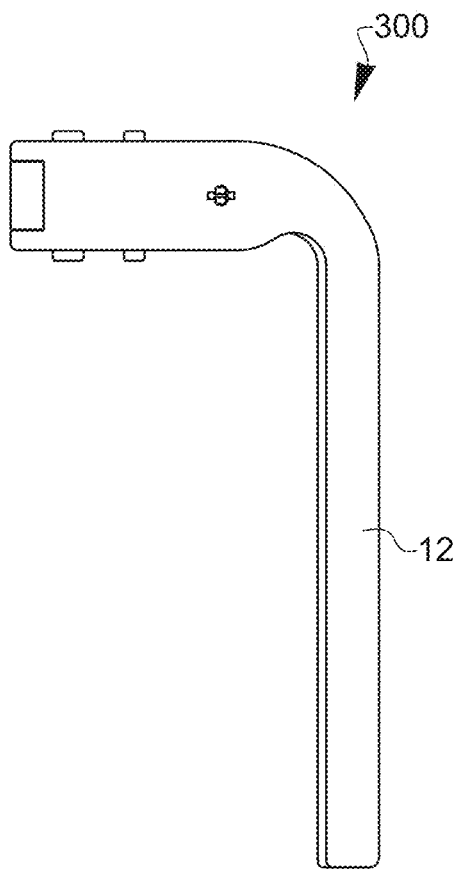
Figure 29C:
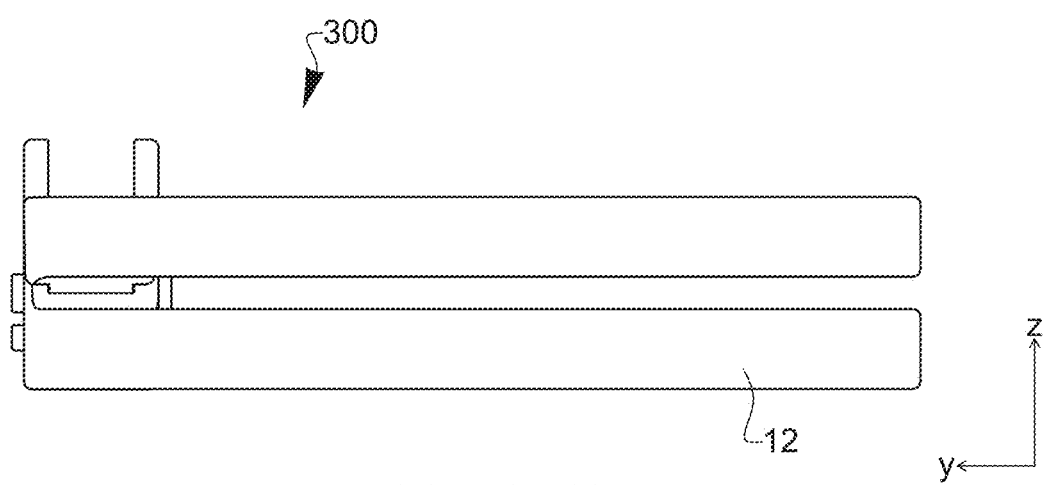
Figure 30:
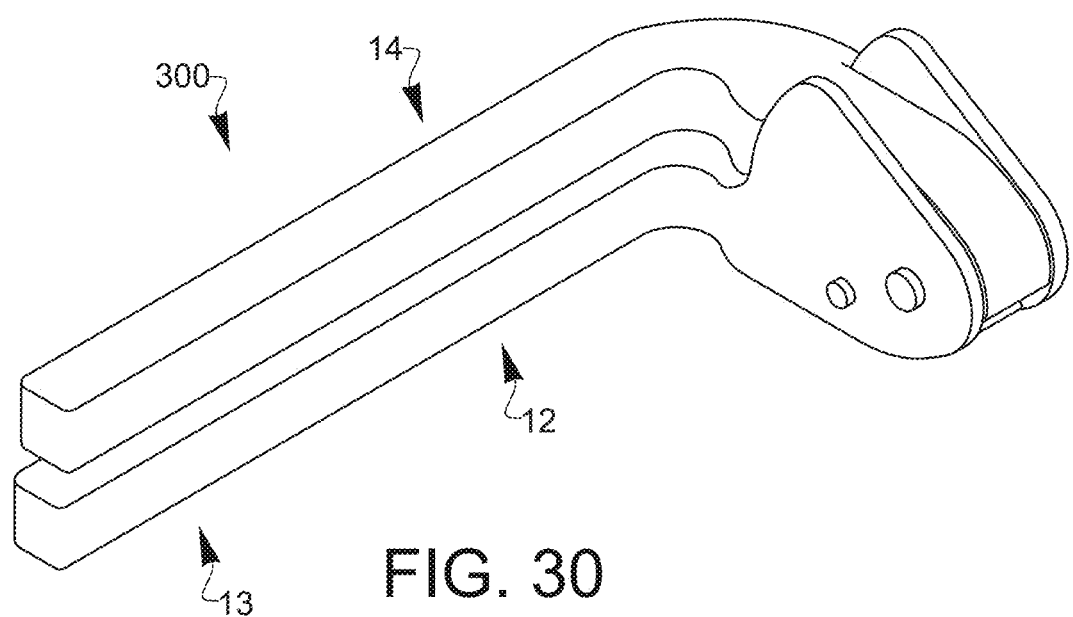

The delivery device assembly 200 may also include the engagement rod 202 that may extend from a proximal end 203 (illustrated in FIG. 27A) to the distal end 205 (illustrated in FIG. 25) along a rod axis that may be parallel to (or substantially parallel to) or coaxially-aligned with (or substantially coaxially-aligned with) the shaft axis 221. The proximal end 203 may be coupled to a coupling portion 235 of a pivot member 234 such that a portion of the engagement rod 202 that is distal to the coupling portion 235 is disposed within the interior portion 224 of the shaft 210. The pivot member 234 may include a plurality of first engagement teeth 236 that may be enmeshed with a corresponding plurality of second engagement teeth 238 disposed on a portion of the actuation lever 207. The pivot member 234 may be pivotably coupled to a portion of the housing portion 208 such that when the actuation lever 207 is pivoted from the first lever position to the second lever position (e.g., in a first direction, or a counter-clockwise direction as illustrated in FIG. 29B), the pivot member 234 may be rotated in a second direction (e.g., in a second direction opposite to the first direction, or in a clockwise direction as illustrated in FIG. 29B).

Figure 28B:
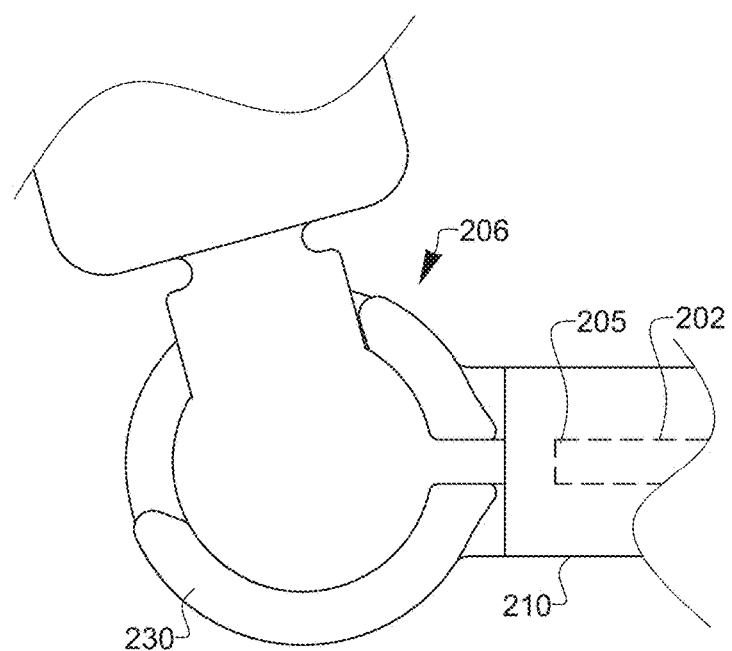
FIG. 28B is a top view of a portion of the embodiment of the delivery device assembly of FIG. 28A.

This rotation in the second direction displaces the coupling portion 235 of a pivot member 234 away from the proximal end 218 of the shaft 210 such that the engagement rod 202 is moved proximally along the rod axis from a first rod position (illustrated in FIGS. 25, 26A, and 27A), in which the distal end 205 of the engagement rod 202 is distal to the distal end 220 of the shaft and adjacent to a portion of the circumferential wall 230 of the coupling portion 228, to a second rod position (illustrated in FIG. 28B), in which the distal end 205 of the engagement rod 202 is proximal to the distal end 220 of the shaft 210 and remote from the portion of the circumferential wall 230 of the coupling portion 228. In this first rod position, the distal end 205 of the engagement rod 202 is at least partially disposed in one of the first linear channel 76a, the second linear channel 76b, of the third linear channel 76c that extends along the upper surface 78 of the cylindrical portion 74 of the coupling member 72 of the first arm assembly 12, thereby retaining the coupling member 72 of the first arm assembly 12 within the coupling portion 228 of the securement portion 206 for the insertion of the vascular clamp assembly 10 to a desired treatment area of a patient. When the vascular clamp assembly 10 has been positioned at the desired treatment area of the patient (and, e.g., transitioned from the first open configuration 11 to the second closed configuration 13), the actuation lever 207 may be displaced towards the grip portion 209 of the housing portion 208 to transition the engagement rod 202 to the second rod position (illustrated in FIG. 28B) in which the distal end 205 of the engagement rod 202 is proximal to the distal end 220 of the shaft 210, and the coupling member 72 of the first arm assembly 12 may be removed from the coupling portion 228 of the securement portion 206 to disengage the vascular clamp assembly 10 from the delivery device assembly 200.

Figure 26B:
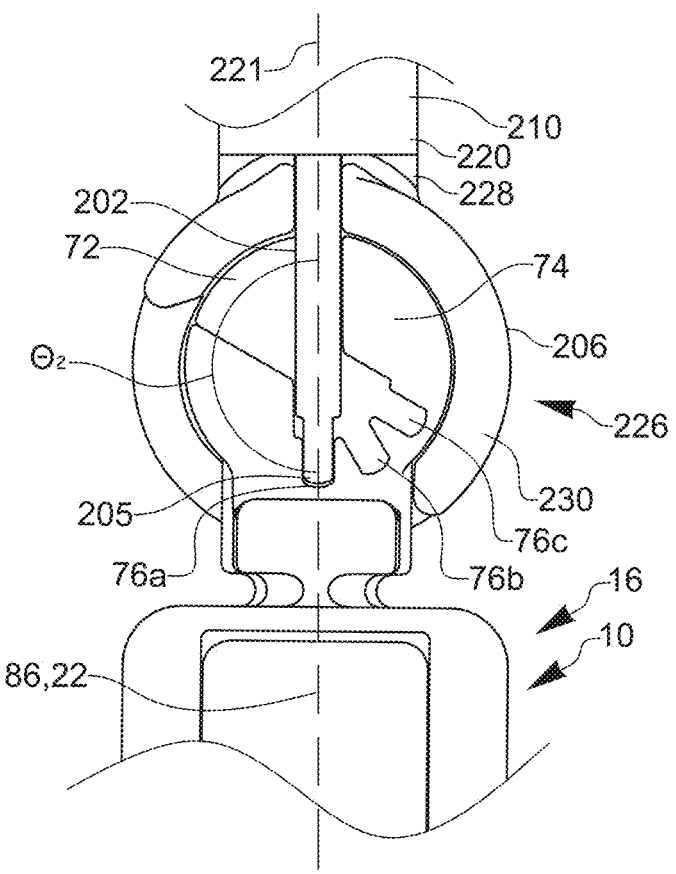
Figure 26C:
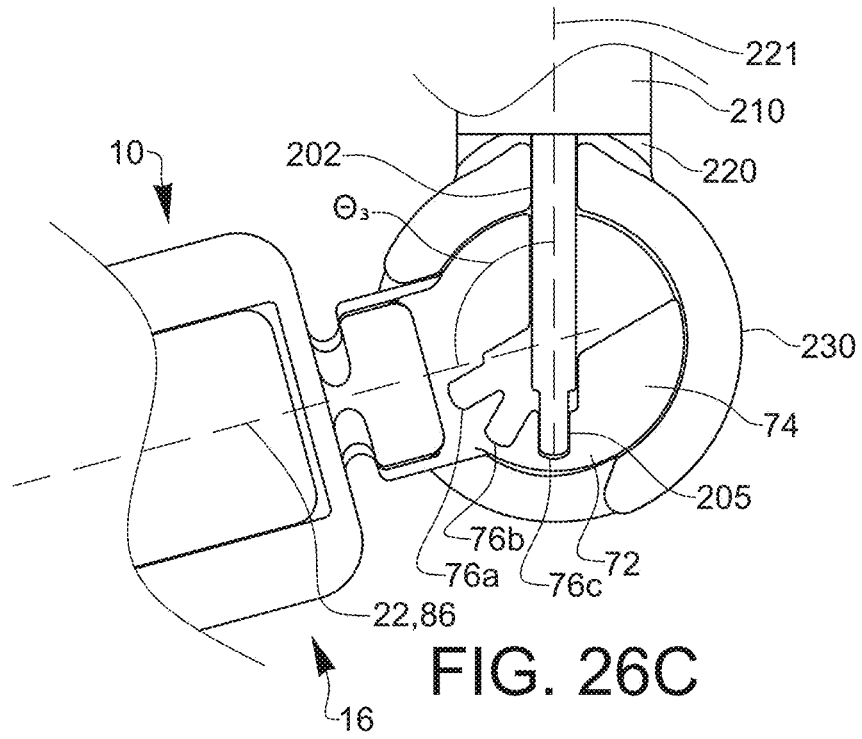

With reference to FIGS. 26A to 26C, the orientation of the vascular clamp assembly 10 may also be changed relative to the shaft 210 of the delivery device assembly 200 for more accurate and efficient introduction of the of the vascular clamp assembly 10 to a treatment area. As previously explained, the coupling member 72 of the first arm assembly 12 may include the cylindrical portion 74 that may include the first linear channel 76a, the second linear channel 76b, and the third linear channel 76c that extends along the upper surface 78 of the cylindrical portion 74. With the coupling member 72 of the first arm assembly 12 disposed within the securement portion 206 of the securement assembly 226 (e.g., disposed within the circumferential wall 230 of the securement portion 206), and when the rod axis of the engagement rod 202 (which is aligned with the shaft axis 221) is aligned with the first linear channel 76a, as illustrated in FIG. 26B (i.e., in a first clamp orientation), the first arm body axis 22 makes a first angle $\theta_1$ with the shaft axis 221, and the first angle $\theta_1$ may be between 200° and 160°, and may be approximately 180°. When the rod axis of the engagement rod 202 is aligned with the second linear channel 76b, as illustrated in FIG. 26A (i.e., in a second clamp orientation), the first arm body axis 22 makes a second angle $\theta_2$ with the shaft axis 221, and the second angle $\theta_2$ may be between 155° and 115°, and may be approximately 135°. When the rod axis of the engagement rod 202 is aligned with the third linear channel 76c, as illustrated in FIG. 26C (i.e., in a third clamp orientation), the first arm body axis 22 makes a third angle $\theta_3$ with the shaft axis 221, and the third angle $\theta_3$ may be between 120° and 80°, and may be approximately 90°. In some embodiments, a portion of the first linear channel 76a may intersect a portion of the second linear channel 76b and a portion of the third linear channel 76c. In some embodiments, the cylindrical portion 74 of the coupling member 72 may include only a single one of the first linear channel 76a, the second linear channel 76b, or the third linear channel 76c. In other embodiments, the cylindrical portion 74 of the coupling member 72 may only include any two of the first linear channel 76a, the second linear channel 76b, and the third linear channel 76c (e.g., the first linear channel 76a and the second linear channel 76b, or the first linear channel 76a and third linear channel 76c, or the second linear channel 76b and the third linear channel 76c). In addition, any number of additional channels disposed along an upper surface 78 of the cylindrical portion 74, and each of these channels may correspond to an additional orientation of the vascular clamp assembly 10 relative to the shaft 210 of the delivery device assembly 200.

When the vascular clamp assembly 10 is positioned by the delivery device assembly 200 to engage a desired blood vessel, the blood vessel may be positioned between a portion of the second engagement surface 130 of the second engagement member 128 of the second arm assembly 14 and a portion of the first engagement surface 70 of the first engagement member 66 of the first arm assembly 12 (illustrated in FIG. 10), and the vascular clamp assembly 10 may be displaced or transitioned from the first open configuration 11 (illustrated in the embodiment of FIGS. 31A to 32) to the second closed configuration 13 (illustrated in FIG. 1) such that the blood vessel is clamped closed between the first arm assembly 12 and the second arm assembly 14. The vascular clamp assembly 10 may be displaced or transitioned from the first open configuration 11 to the second closed configuration 13 (and retained or secured in the second closed configuration 13) in any suitable manner. For example, as illustrated in the cross-sectional view of the first arm body portion 16 and the second arm body portion 80 of FIG. 16 (with the vascular clamp assembly 10 in the second closed configuration 13), a first portion of a first suture 150 may be secured to a first portion of the anchor post 114 of the second arm body portion 80, a second portion of the first suture 150 may engage a portion of the first arm second pulley 44 of the first arm body portion 16 (such as a first pulley of an assembly of two pulleys that are offset along the Y-axis of the reference coordinate system), a third portion of the first suture 150 may engage a portion of the second arm first pulley 108 of the second arm body portion 80 (such as a first pulley of an assembly of two pulleys that are offset along the Y-axis of the reference coordinate system), a fourth portion of the first suture 150 may engage a portion of the first arm first pulley 38 of the first arm body portion 16 (such as a first pulley of an assembly of two pulleys that are offset along the Y-axis of the reference coordinate system), and a fifth portion of the first suture 150 may engage a portion of the second arm second pulley 124 of the second arm body portion 80 (such as a first pulley of an assembly of two pulleys that are offset along the Y-axis of the reference coordinate system). The fifth portion of the first suture 150 may be routed around the second arm second pulley 124 in a first direction shown is a solid line or a second direction shown in a dashed-line.

In addition, a first portion of a second suture 152 may be secured to a second portion of the anchor post 114 of the second arm body portion 80, a second portion of the second suture 152 may engage a second portion of the first arm second pulley 44 of the first arm body portion 16 (such as a second pulley of an assembly of two pulleys that are offset along the Y-axis of the reference coordinate system), a third portion of the second suture 152 may engage a second portion of the second arm first pulley 108 of the second arm body portion 80 (such as a second pulley of an assembly of two pulleys that are offset along the Y-axis of the reference coordinate system), a fourth portion of the second suture 152 may engage a second portion of the first arm first pulley 38 of the first arm body portion 16 (such as a second pulley of an assembly of two pulleys that are offset along the Y-axis of the reference coordinate system), and a fifth portion of the second suture 152 may engage a second portion of the second arm second pulley 124 of the second arm body portion 80 (such as a second pulley of an assembly of two pulleys that are offset along the Y-axis of the reference coordinate system). The fifth portion of the second suture 152 may be routed around the second arm second pulley 124 in a first direction shown is a solid line or a second direction shown in a dashed-line, and the direction may correlate to the direction of the fifth portion of the first suture 150 routed around the second arm second pulley 124. The first suture 150 and the second suture 152 may be tightened to draw the second engagement surface 130 of the second engagement member 128 of the second arm assembly 14 towards the first engagement surface 70 of the first engagement member 66 of the first arm assembly 12 (and vice versa) to "tighten" the vascular clamp assembly's 10 grip on the blood vessel. With the first suture 150 and the second suture 152 so tightened, a sixth portion (i.e., an end portion) of the first suture 150 and a sixth portion (i.e., an end portion) of the second suture 152 may be secured to maintain the grip on the blood vessel, and the sixth portion of the first suture 150 and the sixth portion of the second suture 152 may be secured in any suitable manner, such as by one or more knots. In some embodiments, the sixth portion of the first suture 150 and the sixth portion of the second suture 152 may be secured by a deformable fastener 154, such as a fastener deformed by a COR-KNOT® DEVICE sold by LSI Solutions, Inc. of Victor, New York, and described in U.S. Pat. Nos. 10,772,618 and 7,235,086, each of which is herein incorporated by reference in its entirety. In some embodiments, only a single suture may be used (i.e., the first suture 150), and the end of the sixth portion of the first suture 150 may be secured to tighten the vascular clamp assembly 10 as described.

With reference to FIGS. 29A to 34, a further embodiment of a vascular clamp assembly 300 is disclosed, and features similar or identical to those of the vascular clamp assembly 10 that have been previously described use the same reference numbers. In the vascular clamp assembly 300, the first arm body axis 22 may be disposed at a first arm angle 301 relative to the first clamp arm axis 29, and the first arm angle 31 may be between 80 degrees and 100 degrees, and may be substantially 90 degrees. As illustrated in the cross-sectional view of the first arm body portion 16 and the second arm body portion 80 of FIG. 34 (with the vascular clamp assembly 300 in the second closed configuration 13), the second arm body portion 80 may include the first recess 106 that receives the second arm first pulley 108, and the first arm body portion 16 may include the first recess 36 that includes the first arm first pulley 38. So configured, a first portion of a first suture 150 may be secured to a first portion of the anchor post 114 of the second arm body portion 80, a second portion of the first suture 150 may engage a portion of the first arm first pulley 38 of the first arm body portion 16 (such as a first pulley of an assembly of two pulleys that are offset along the Y-axis of the reference coordinate system), a third portion of the first suture 150 may engage a portion of the second arm first pulley 108 of the second arm body portion 80 (such as a first pulley of an assembly of two pulleys that are offset along the Y-axis of the reference coordinate system), and a fourth portion of the first suture 150 may be routed through an aperture 156 formed through the first arm body portion 16 such that a fifth portion (i.e., and end portion) of the first suture 150 extends through the aperture 156.

In addition, a first portion of a second suture 152 may be secured to a second portion of the anchor post 114 of the second arm body portion 80, a second portion of the second suture 152 may engage a second portion of the first arm first pulley 38 of the first arm body portion 16 (such as a second pulley of an assembly of two pulleys that are offset along the Y-axis of the reference coordinate system), a third portion of the second suture 152 may engage a second portion of the second arm first pulley 108 of the second arm body portion 80 (such as a second pulley of an assembly of two pulleys that are offset along the Y-axis of the reference coordinate system), and a fourth portion of the second suture 152 may be routed through the aperture 156 formed through the first arm body portion 16 such that a fifth portion (i.e., and end portion) of the second suture 152 extends through the aperture 156. The fifth portion of the first suture 150 and the fifth portion of the second suture 152 may be coupled as described with reference to the vascular clamp assembly 10. In some embodiments, only a single suture (i.e., the first suture 150) may be used to secure or tighten the vascular clamp assembly 300, as with the vascular clamp assembly 10.

Various advantages of a vascular clamp assembly have been discussed above. Embodiments discussed herein have been described by way of example in this specification. It will be apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and the scope of the claimed invention. The drawings included herein are not necessarily drawn to scale. Additionally, the recited order of processing elements or sequences, or the use of numbers, letters, or other designations therefore, is not intended to limit the claims to any order, except as may be specified in the claims. Accordingly, the invention is limited only by the following claims and equivalents thereto.

What is claimed is:

1. A vascular clamp assembly comprising:
   a first arm assembly comprising:
      a first arm body portion extending from a first end to a second end along a first arm body axis, the first arm body portion including an elongated first base portion that extends from the first end of the first arm body portion to the second end of the first arm body portion, wherein the first base portion is partially defined by an inner surface, wherein a first recess is formed in a first portion of the inner surface of the first base portion, and wherein a first arm first pulley is rotatably disposed in at least a portion of the first recess;
      a first clamp arm portion extending from a first end to a second end along a first clamp arm axis, wherein the second end of the first arm body portion is coupled to the first end of the first clamp arm portion, wherein the first arm body axis and the first clamp arm axis are each linear, and the first arm body axis is disposed at a first arm angle relative to the first clamp arm axis, and the first arm angle is an angle less than 150 degrees; and
      a coupling member extending from the first end of the first arm body portion, the coupling member comprising:
         a cylindrical portion having a first linear channel and a second linear channel that each extends along an upper surface of the cylindrical portion, each of the first linear channel and the second linear channel is configured to receive a distal end of an engagement rod of a delivery device assembly to secure the coupling member within a securement portion of the delivery device assembly in one of at least two possible orientations of the vascular clamp assembly; and
   a second arm assembly pivotably coupled to the first arm assembly, the second arm assembly comprising:
      a second arm body portion extending from a first end to a second end along a second arm body axis, wherein the second arm body portion is partially defined by an inner surface, wherein a first recess is formed in a first portion of the inner surface of the second arm body portion, and wherein a second arm first pulley is rotatably disposed in at least a portion of the first recess; and a second clamp arm portion extending from a first end to a second end along a second clamp arm axis, wherein the second end of the second arm body portion is coupled to the first end of the second clamp arm portion, wherein the second arm body axis and the second clamp arm axis are each linear, and the second arm body axis is disposed at the first arm angle relative to the second clamp arm axis; and wherein the vascular clamp assembly is configured to displace between a first open configuration to a second closed configuration in which a portion of the first clamp arm portion and a portion of the second clamp arm portion each contacts a corresponding portion of a vascular structure to clamp the portion of the vascular structure, wherein a first portion of a first suture is configured to be fixed to a portion of the first arm assembly, a second portion of the first suture is configured to contact a portion of the first arm first pulley, and wherein a first portion of a second suture is configured to be fixed to a portion of the second arm assembly, a second portion of the second suture is configured to contact a portion of the second arm first pulley, and the vascular clamp assembly is configured to displace between the first open configuration to the second closed configuration by a pulling force applied to each of a third portion of the first suture and a third portion of the second suture.

2. The vascular clamp assembly of claim 1, the first arm body portion of the first arm assembly further comprising:

a first lateral wall extending from a first lateral edge of the first base portion; and a second lateral wall extending from a second lateral edge of the first base portion, each of the first lateral wall and the second lateral wall being planar, and wherein each of the first lateral wall and the second lateral wall include a lateral edge that is configured to extend to a portion of the second arm assembly when the vascular clamp assembly is in the first open configuration to prevent tissue from being pinched between the first arm assembly and the second arm assembly when the vascular clamp assembly is pivoted from the first open configuration to the second closed configuration.

3. The vascular clamp assembly of claim 1, wherein the first linear channel, the second linear channel, and the third linear channel each extends along an upper surface of the cylindrical portion.

4. The vascular clamp assembly of claim 1, wherein the first arm angle is an obtuse angle.

5. The vascular clamp assembly of claim 4, wherein the first arm angle is an angle between 120 degrees and 150 degrees.

6. The vascular clamp assembly of claim 5, wherein the first arm angle is an angle between 130 degrees and 140 degrees.

7. The vascular clamp assembly of claim 1, wherein the first arm angle is an angle between 80 degrees and 100 degrees.

8. The vascular clamp assembly of claim 7, wherein the first arm angle is substantially 90 degrees.

9. The vascular clamp assembly of claim 1, wherein a second recess is formed in a second portion of the inner surface of the first base portion, and wherein a first arm second pulley is rotatably disposed in at least a portion of the second recess, and a fourth portion of the first suture is configured to contact a portion of the first arm second pulley as the vascular clamp assembly is displaced between the first open configuration and the second closed configuration by the pulling force applied to each of the third portion of the first suture and the third portion of the second suture.

10. The vascular clamp assembly of claim 9, wherein a second recess is formed in a second portion of the inner surface of the second arm body portion, and wherein a second arm second pulley is rotatably disposed in at least a portion of the second recess, and a fourth portion of the second suture is configured to contact a portion of the second arm second pulley as the vascular clamp assembly is displaced between the first open configuration and the second closed configuration by the pulling force applied to each of the third portion of the first suture and the third portion of the second suture.

11. The vascular clamp assembly of claim 1, wherein the second end of the first arm body portion is integrally formed with the first end of the first clamp arm portion and the second end of the second arm body portion is integrally formed with the first end of the second clamp arm portion.

12. The vascular clamp assembly of claim 1, wherein a portion of the first linear channel intersects a portion of the second linear channel and a portion of the third linear channel.

13. The vascular clamp assembly of claim 1, wherein the cylindrical portion has the first linear channel, the second linear channel, and a third linear channel that each extends along the upper surface of the cylindrical portion, each of the first linear channel, the second linear channel, and the third linear channel is configured to receive the distal end of the engagement rod of the delivery device assembly to secure the coupling member within a securement portion of the delivery device in one of three possible orientations of the vascular clamp assembly.

* * * * *